(12) United States Patent
Long

(10) Patent No.: US 6,526,416 B1
(45) Date of Patent: Feb. 25, 2003

(54) COMPENSATING RESOURCE MANAGERS

(75) Inventor: Joe Dennis Long, Woodinville, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 09/114,230

(22) Filed: Jun. 30, 1998

(51) Int. Cl.[7] .............................................. G06F 15/00
(52) U.S. Cl. ..................... 707/202; 709/101; 709/104; 714/20
(58) Field of Search ................................ 709/100–107; 707/202; 714/19, 20

(56) References Cited

U.S. PATENT DOCUMENTS

| | | |
|---|---|---|
| 4,752,928 A | 6/1988 | Chapman et al. |
| 5,125,091 A | 6/1992 | Staas, Jr. et al. |
| 5,151,987 A | 9/1992 | Abraham et al. |

(List continued on next page.)

FOREIGN PATENT DOCUMENTS

| | | |
|---|---|---|
| EP | 0 414 624 A | 2/1991 |
| EP | 0623876 A2 | 3/1994 |
| EP | 0 674 260 A | 9/1995 |
| EP | 0 738 966 A | 10/1996 |
| EP | 0 777 178 A | 6/1997 |
| WO | WO 98 02809 A | 1/1998 |

OTHER PUBLICATIONS

Lam, "Building Scalable Apps," PC Tech Magazine, pp. 209–214 (Apr. 1998).
Tomsen, "Virtually Crash–Proof your Web site with IIS 4.0," Microsoft Interactive Developer, 2:10, pp. 41–46 (Oct. 1997).

Hackathorn R., "Publish or Perish, Solutions to overworked networks and unruly software distribution are just part of P&S," BYTE Magazine, pp. 1–15 (Sep. 1997).
Matena et al., "Enterprise JavaBeans™," Version 1.0 Specification, Sun Microsystems, pp. 1–181 (Mar. 21, 1998).
Sessions, COM and DCOM: Microsoft's Vision for Distributed Objects, Chapter 10, "Clustering," pp. 413–442, 1998.
Nance, "Balance the Load with Transaction Server," BYTE Magazine, pp. 1–8 (Jun. 1997).
McKay, "Microsoft talks up tools" InfoWorld, 20:19, 2 pp. (May 11, 1998).

(List continued on next page.)

*Primary Examiner*—Majid A. Banankhah
(74) *Attorney, Agent, or Firm*—Klarquist Sparkman, LLP

(57) ABSTRACT

A compensating resource manager provides a mechanism for more easily integrating non-transactional durable resources to participate in transactions within a component-based on-line transaction processing system, a well as resources having transaction processing support not conforming to the transaction processing system. The durable resource is integrated using the compensating resource manager by developing two simple components, a worker component that implements a normal action on the resource and a compensator component that implements a compensating action that reverses the normal action on the resource. The worker component uses system-provided services to register its respective compensator component and to log information, such as on a write-ahead basis, to allow the compensator component to reverse its normal action. The system-provided service enlists in a transaction in which the worker component performs its normal action to receive two phase commit notifications, for the transaction, and responsive thereto creates the compensator component to perform appropriate clean-up or compensating action according to the logged information depending on whether the transaction commits or aborts.

25 Claims, 18 Drawing Sheets

U.S. PATENT DOCUMENTS

| | | | |
|---|---|---|---|
| 5,212,793 A | | 5/1993 | Donica et al. |
| 5,278,982 A | * | 1/1994 | Daniels et al. ............... 707/202 |
| 5,455,953 A | | 10/1995 | Russell |
| 5,524,238 A | | 6/1996 | Miller et al. |
| 5,561,797 A | | 10/1996 | Gilles et al. |
| 5,577,252 A | | 11/1996 | Nelson et al. |
| 5,581,686 A | | 12/1996 | Koppolu et al. |
| 5,581,760 A | | 12/1996 | Atkinson et al. |
| 5,687,370 A | | 11/1997 | Garst et al. |
| 5,706,429 A | | 1/1998 | Lai et al. |
| 5,717,439 A | | 2/1998 | Levine et al. |
| 5,764,897 A | | 6/1998 | Khalidi |
| 5,778,365 A | | 7/1998 | Nishiyama |
| 5,781,910 A | | 7/1998 | Gostanian et al. |
| 5,794,038 A | | 8/1998 | Stutz et al. |
| 5,802,291 A | | 9/1998 | Balick et al. |
| 5,815,665 A | | 9/1998 | Teper et al. |
| 5,822,585 A | | 10/1998 | Noble et al. |
| 5,864,683 A | | 1/1999 | Boebert et al. |
| 5,875,291 A | | 2/1999 | Fox |
| 5,881,225 A | | 3/1999 | Worth |
| 5,884,316 A | | 3/1999 | Bernstein et al. |
| 5,884,327 A | | 3/1999 | Cotner et al. |
| 5,889,957 A | | 3/1999 | Ratner et al. |
| 5,890,161 A | | 3/1999 | Helland et al. |
| 5,913,061 A | | 6/1999 | Gupta et al. |
| 5,933,593 A | | 8/1999 | Arun et al. |
| 5,941,947 A | | 8/1999 | Brown et al. |
| 5,958,004 A | | 9/1999 | Helland et al. |
| 6,026,428 A | | 2/2000 | Hutchison et al. |
| 6,094,688 A | | 7/2000 | Mellen-Garnett et al. |
| 6,105,147 A | | 8/2000 | Molloy |

OTHER PUBLICATIONS

Bowen, "Intel's Middleware Move," InfoWorld, vol. 20, Issue 9: 1–2, 1998.

U.S. patent application Ser. No. 09/225,896, Helland et al., filed Jan. 4, 1999.

U.S. patent application Ser. No. 09/351,374, Helland et al., filed Jul. 12, 1999.

"Implementing Locale As Dynamically Loaded Shared Object Files", ibm Technical Disclosure Bulletin, US, IBM Corp., New York, vol. 34, No. 12, pps. 117–118 XP000308454 ISSN: 0018–8689—the whole document.

Bernstein and Newcomer, "Database System Recovery," Principles of Transaction Processing for the Systems Professional, Morgan Kaufmann Publishers, Inc., San Francisco, CA, chapter 8, pp. 241–266 (1997).

Gray & Reuter, "Log Manager," Transaction Processing: Concepts and Techniques, Morgan Kaufmann Publishers, San Francisco, CA, chapter 9, pp. 493–525 (1993).

R. Limprecht, "Microsoft Transaction Server", IEEE, pp. 14–18 (Feb. 1997).

G. Eddon, "COM+: The Evolution of Component Services", IEEE on Computer, pp. 104–106 (Jul. 1999).

Object Transaction Services, OMG document 94.6.1 (Jun. 1994).

(No author given) "Transaction Context Objects in Microsoft TRansaction Server", MSDN, pp (2) (Jun. 1997).

D. Chappell, "The Microsoft Transaction Server (MTS)—Transactions Meet Components", white paper, Microsoft.com (Jun. 1997).

"Implementing Locale As Dynamically Loaded Shared Objects Files", ibm Technical Disclosure Bulletin, US, IBM Corp., New York, vol. 34, No. 12, pps. 117–118 XP000308454 ISSN: 0018–8689—the whole document.

Tripathi, A.R. et al.: Design Of a Remote Procedure Call System For Object–Oriented Distributed Programming, Software Practice & Experience, GB, John Wiley & Sons Ltd., Chichester, vol. 28, No. 1, pp. 23–47 XP000723715, ISSN: 0038–0644—the whole document.

D. Bruce, "The Treatment of State in Optimistic Systems", IEEE, pp. 40–49 (Jun. 1995).

Sessions, COM and DCOM: Microsoft's Vision for Distributed Objects, Chapter 6, Sharing and Scalability, pp. 249–313. (1998).

D. Bruce, "The Treatment of State in Optimistic Systems", IEEE, pp. 40–49 (Jun. 1995).

* cited by examiner

FIG. 6

```
300  [ object,
         uuid(F0BAF8E3-7804-11d1-82E9-00A0C91EEDE9),
         helpstring("ICrmLogControl Interface"),
         pointer_default(unique)]

interface ICrmLogControl : IUnknown
    {
        // get the Unit Of Work (UOW) identifier for the current transaction
        // will be returned as a stringized GUID of form
        // {7BB101F1-92B6-11d1-82EC-00A0C91EEDE9}
        [propget, id(1), helpstring("property TransactionUOW")]
        HRESULT TransactionUOW([out, retval] BSTR * pVal);

// register the CRM Compensator
        // can directly pass in BSTR * or C-style wide string
        // can also accept stringized GUID of form
        // {7BB101F1-92B6-11d1-82EC-00A0C91EEDE9} instead of Prog Id
        [id(2), helpstring("method RegisterCompensator")]
        HRESULT RegisterCompensator(
            [in] LPCWSTR lpcwstrProgIdCompensator,
            [in] LPCWSTR lpcwstrDescription);

// for use by VB - write a collection of variants to the log
        [id(3), helpstring("method WriteLogRecordVariants")]
        HRESULT WriteLogRecordVariants([in] IUnknown * punkCollection);

// force all log records (that have been written so far) to disk
        [id(4), helpstring("method ForceLog")]
        HRESULT ForceLog();

// forget the last log record written by this instance of this interface
        [id(5), helpstring("method ForgetLogRecord")]
        HRESULT ForgetLogRecord();

// force an abort of the current transaction
        [id(6), helpstring("method ForceTransactionToAbort")]
        HRESULT ForceTransactionToAbort();

// for use by VC - write an unstructured record to the log
        // NOTE: implements gather using an array of blobs
        HRESULT WriteLogRecord(
            [in, size_is(cBlob)] BLOB rgBlob[], [in] ULONG cBlob);
    };
```

FIG. 7

```
typedef enum tagCrmFlags
{   crmflag_ForgetTarget          =    0x00000001,
    crmflag_WrittenDuringPrepare  =    0x00000002,
    crmflag_WrittenDuringCommit   =    0x00000004,
    crmflag_WrittenDuringAbort    =    0x00000008,
    crmflag_WrittenDuringRecovery =    0x00000010,
    crmflag_WrittenDuringReplay   =    0x00000020,
    crmflag_ReplayInProgress      =    0x00000040,
} CrmFlags;

typedef struct tagCrmLogRecordRead
{   DWORD  dwCrmFlags;
    DWORD  dwSequenceNumber;
    BLOB   blobUserData;
} CrmLogRecordRead;
```

```
[ object,
    uuid(F0BAF8E4-7804-11d1-82E9-00A0C91EEDE9),
    helpstring("ICrmCompensatorVariants Interface"),
    pointer_default(unique)]
interface ICrmCompensatorVariants : IUnknown {
    [id(1), helpstring("method SetLogControlVariants")]
    HRESULT SetLogControlVariants([in] ICrmLogControl * pLogControl);

[id(2), helpstring("method BeginPrepareVariants")]
    HRESULT BeginPrepareVariants();

[id(3), helpstring("method PrepareRecordVariants")]
    HRESULT PrepareRecordVariants(
        [in] VARIANT * pLogRecord,
        [out, retval] VARIANT_BOOL * bForget);

[id(4), helpstring("method EndPrepareVariants")]
    HRESULT EndPrepareVariants(
        [out, retval] VARIANT_BOOL * bOkToPrepare);

[id(5), helpstring("method BeginCommitVariants")]
    HRESULT BeginCommitVariants([in] VARIANT_BOOL bRecovery);

[id(6), helpstring("method CommitRecordVariants")]
    HRESULT CommitRecordVariants(
        [in] VARIANT * pLogRecord,
        [out, retval] VARIANT_BOOL * bForget);

[id(7), helpstring("method EndCommitVariants")]
    HRESULT EndCommitVariants();

[id(8), helpstring("method BeginAbortVariants")]
    HRESULT BeginAbortVariants([in] VARIANT_BOOL bRecovery);

[id(9), helpstring("method AbortRecordVariants")]
    HRESULT AbortRecordVariants(
        [in] VARIANT * pLogRecord,
        [out, retval] VARIANT_BOOL * bForget);

[id(10), helpstring("method EndAbortVariants")]
    HRESULT EndAbortVariants();
};
```

FIG. 9

```
304
    [   object,
        uuid(BBC01830-8D3B-11d1-82EC-00A0C91EEDE9),
        helpstring("ICrmCompensator Interface"),
        pointer_default(unique)]
    interface ICrmCompensator : IUnknown
    {
        HRESULT SetLogControl([in] ICrmLogControl * pLogControl);

// PREPARE - phase 1 - log records delivered in forward order
        // NOTE: log records are delivered as a single blob
        HRESULT BeginPrepare();

HRESULT PrepareRecord(
            [in] CrmLogRecordRead crmLogRec,
            [out, retval] BOOL * fForget);

HRESULT EndPrepare([out, retval] BOOL * fOkToPrepare);

// COMMIT - phase 2 - log records delivered in forward order
        HRESULT BeginCommit([in] BOOL fRecovery);

HRESULT CommitRecord(
            [in] CrmLogRecordRead crmLogRec,
            [out, retval] BOOL * fForget);

HRESULT EndCommit();

// ABORT - phase 2 - log records delivered in reverse order
        HRESULT BeginAbort([in] BOOL fRecovery);

HRESULT AbortRecord(
            [in] CrmLogRecordRead crmLogRec,
            [out, retval] BOOL * fForget);

HRESULT EndAbort();
    };
```

```
interface ILogRecover : IUnknown
{
    HRESULT AppendRecord(
        [in] LOGRECORD_WRITE* logrec,
        [in] BOOL fForceNow,
        [in] ILogAsyncCompletion* pasync,
        [out] LSN* plsn);
    HRESULT AppendCompensationRecord (
        [in] LOGRECORD_READ* logrec,
        [in] LOGCOMPENSATIONRECORD* clr,
        [in] BOOL fForceNow,
        [in] ILogAsyncCompletion* pasync,
        [out] LSN* plsn );
    HRESULT ReadRecord (
        [in] LSN lsn,
        [out] LOGRECORD_READ* pRec,
        [in] ILogAsyncCompletion* pasync );
    HRESULT Force (
        [in] LSN lsnMinToForce,
        [in] ILogAsyncCompletion* pasync );
    HRESULT Recover (
        [in] ILogAsyncCompletion* pasync );
    HRESULT TakeCheckpoint (
        [in] ILogAsyncCompletion* pasync );
    HRESULT RollBackTransaction (
        [in] LSN lsnSavePoint,
        [in] XACTUOW* puow,
        [in] ILogAsyncCompletion* pasync );
    HRESULT GetLogBound (
        [out] LSN* lsn );
    HRESULT GetLastLSNOfTransaction (
        [in] XACTUOW* puow,
        [out] LSN* lsn );
};
```

```
interface ILogRecoverClerk : IPersist
{
    HRESULT BeginRecovery (
        [in] ILogRecover* plog );
    HRESULT AnalyzeRecord (
        [in] LOGRECORD_READ* logrec );
    HRESULT GetMinRedoLSN (
        [out] LSN* lsn );
    HRESULT BeginRedoPass ( );
    HRESULT RedoRecord (
        [in] LOGRECORD_READ* logrec );
    HRESULT BeginUndoPass ( );
    HRESULT UndoRecord (
        [in] LOGRECORD_READ* logrec,
        [out] LSN* lsnCLR );
    HRESULT EndRecovery ( );
    HRESULT WriteCheckpoint (
        [in,unique] ILogAsyncCompletion* pasync,
        [out] LSN* lsnMinInUse );
    HRESULT RollbackRecord (
        [in] LOGRECORD_READ* logrec,
        [out] LSN* lsnCLR );
};
```

```
310    interface ILogRecoverClerkPhaseNotification : IUnknown
       {
           HRESULT OnPrepare (
               [in] XACTUOW* uow,
               [in] ILogRecover* pLog );
           HRESULT OnCommit (
               [in] XACTUOW* uow,
               [in] ILogRecover* pLog );
           HRESULT OnAbort (
               [in] XACTUOW* uow,
               [in] ILogRecover* pLog );
           HRESULT OnInDoubt (
               [in] XACTUOW* uow,
               [in] ILogRecover* pLog );
       };
```

```
interface ILogRecoverClerkRegistration : IUnknown
{
    HRESULT RegisterClerk (
        [in,unique] ILogRecoverClerk* pclerk,
        [in] BOOL fFaultInable );
    HRESULT GetClerk (
        [in] REFCLSID clsidClerk,
        [in] REFIID iid,
        [out, iid_is(iid)] LPVOID* ppv );
    HRESULT UnregisterClerk (
        [in] ILogRecoverClerk* pclerk );
};
```

```
interface ILog : IUnknown
{
    HRESULT Force ( [in] LSN lsnMinToForce );
    HRESULT AppendRecord (
        [in] BLOB* rgBlob,
        [in] ULONG cBlob,
        [in] BOOL fForceNow,
        [out] LSN* lsn );
    HRESULT ReadRecord (
        [in] LSN lsnToRead,
        [out] LSN* plsnPrev,
        [out] LSN* plsnNext,
        [out] LPVOID* ppvData,
        [out] ULONG* pcbData,
        [out] PVOID* ppvToken );
    HRESULT ReadRecordRelease ([in] PVOID pvToken);
    HRESULT ReadRecordPrefix (
        [in] LSN lsnToRead,
        [out] LSN* plsnPrev,
        [out] LSN* plsnNext,
        [out] LPVOID pvData,
        [in,out] ULONG* pcbData,
        [out] ULONG* pcbRecord );
    HRESULT GetLogLimits (
        [out] LSN* lsnFirst,
        [out] LSN* lsnLast );
    HRESULT TruncatePrefix ([in] LSN lsnFirstToKeep );
    HRESULT SetAccessPolicyHint (
        [in] RECORD_READING_POLICY policy );
};
```

FIG. 15

```
316     [
            object,
            uuid(9C51D821-C98B-11d1-82FB-00A0C91EEDE9),
            helpstring("ICrmFormatLogRecords Interface"),
            pointer_default(unique)
        ]
        interface ICrmFormatLogRecords : IUnknown
        {
            [id(1), helpstring("method GetColumnCount")]
            HRESULT GetColumnCount([out] long *plColumnCount);

[id(2), helpstring("method GetColumnHeaders")]
            HRESULT GetColumnHeaders([out] LPVARIANT pHeaders);

[id(3), helpstring("method GetColumn")]
            HRESULT GetColumn(
                [in] CrmLogRecordRead CrmLogRec,
                [out] LPVARIANT pFormattedLogRecord);

[id(4), helpstring("method GetColumnVariants")]
            HRESULT GetColumnVariants(
                [in] VARIANT LogRecord,
                [out] LPVARIANT pFormattedLogRecord);
        };
```

FIG. 16

```
typedef enum tagCrmTransactionState
{   TxState_Active,
    TxState_Committed,
    TxState_Aborted,
    TxState_Indoubt, } CrmTransactionState;

// ICrmMonitorLogRecords - this is used to inspect specific log records
// It is implemented by the CRM clerk
[
    object,
    uuid(70C8E441-C7ED-11d1-82FB-00A0C91EEDE9),
    helpstring("ICrmMonitorLogRecords Interface"),
    pointer_default(unique)]
interface ICrmMonitorLogRecords : IUnknown
{   // how many log records? (write records only)
    [propget, id(1), helpstring("property Count")]
    HRESULT Count([out, retval] long *pVal);

// current state of the transaction?
    [propget, id(2), helpstring("property TransactionState")]
    HRESULT TransactionState([out, retval] CrmTransactionState *pVal);

// does this CRM clerk have structured records?
    [propget, id(3), helpstring("property StructuredRecords")]
    HRESULT StructuredRecords([out, retval] VARIANT_BOOL *pVal);

// get the log record indicated by the zero based index # VC version
    [id(4), helpstring("method GetLogRecord")]
    HRESULT GetLogRecord(
        [in] DWORD dwIndex,
        [in, out] CrmLogRecordRead *pCrmLogRec);

// VB version
    [id(5), helpstring("method GetLogRecordVariants")]
    HRESULT GetLogRecordVariants(
        [in] VARIANT IndexNumber,
        [out, retval] LPVARIANT pLogRecord);
};
```

```
// ICrmMonitorClerks - this is used to find out which clerk is of interest
// It is implemented by the clerks collection object
[   object,
    uuid(70C8E442-C7ED-11d1-82FB-00A0C91EEDE9),
    dual,
    helpstring("ICrmMonitorClerks Interface"),
    pointer_default(unique)]
interface ICrmMonitorClerks : IDispatch
{   // index is numeric, returns ClerkInstanceClsid as a VT_BSTR
    [id(DISPID_VALUE), helpstring("method Item")]
    HRESULT Item([in] VARIANT Index, [out, retval] LPVARIANT pItem);

[propget, id(DISPID_NEWENUM), helpstring("property _NewEnum"),
        restricted]
    HRESULT _NewEnum([out, retval] LPUNKNOWN *pVal);

[propget, id(1), helpstring("property Count")]
    HRESULT Count([out, retval] long *pVal);

// index is numeric OR index is ClerkInstanceClsid as VT_BSTR -
    // returns value as VT_BSTR
    [id(2), helpstring("method ProgIdCompensator")]
    HRESULT ProgIdCompensator(
        [in] VARIANT Index,
        [out, retval] LPVARIANT pItem);

[id(3), helpstring("method Description")]
    HRESULT Description([in] VARIANT Index, [out, retval] LPVARIANT pItem);

[id(4), helpstring("method TransactionUOW")]
    HRESULT TransactionUOW(
        [in] VARIANT Index,
        [out, retval] LPVARIANT pItem);

[id(5), helpstring("method ActivityId")]
    HRESULT ActivityId([in] VARIANT Index, [out, retval] LPVARIANT pItem);
};
```

FIG. 18

```
320     // ICrmMonitor - this is implemented by the CRM recovery clerk
        // It is used to get first the ICrmMonitorClerks collection, then the clerk itself

[
            object,
            uuid(70C8E443-C7ED-11d1-82FB-00A0C91EEDE9),
            helpstring("ICrmMonitor Interface"),
            pointer_default(unique)]
        interface ICrmMonitor : IUnknown
        {
            // gets a snapshot of the current state of the list of CRM clerks
            [id(1), helpstring("method GetClerks")]
            HRESULT GetClerks([out, retval] ICrmMonitorClerks **pClerks);

// get an ICrmMonitorLogRecords interface on the specified CRM clerk
            // NOTE: could return E_FAIL if that CRM clerk has completed
            // index is ClerkInstanceClsid as a VT_BSTR, returns
            // ICrmMonitorLogRecords as VT_UNKNOWN
            [id(2), helpstring("method HoldClerk")]
            HRESULT HoldClerk([in] VARIANT Index, [out, retval] LPVARIANT pItem);
        };
```

COMPENSATING RESOURCE MANAGERS

FIELD OF THE INVENTION

The present invention relates generally to on-line transaction processing applications, and more particularly relates to managing non transactional resources or non-compliant transactional resources in transaction management systems for on-line transaction processing applications.

BACKGROUND AND SUMMARY OF THE INVENTION

In many information processing applications, a server application running on a host or server computer in a distributed network provides processing services or methods for client applications running on terminal or workstation computers of the network which are operated by a multitude of users. Common examples of such server applications include software for processing class registrations at a university, travel reservations, money transfers and other services at a bank, and sales at a business. In these examples, the processing services provided by the server application typically maintains persistent data or "state" of class schedules, hotel reservations, account balances, order shipments, payments, or inventory for actions initiated by the individual users at their respective stations, such as in a database or other proprietary format data store.

Often, server applications require coordinating activities on multiple computers, by separate processes on one computer, and even within a sin process. For example, a money transfer operation in a banking application may involve updates to account information held in separate databases that reside on separate computers that may be geographically remote. Desirably, groups of activities that form parts of an operation are coordinated so as to take effect as a single indivisible unit of work, commonly referred to as a transaction. In many applications, performing sets of activities as a transaction becomes a business necessity. For example;, if only one account is updated in a money transfer operation due to a system failure, the bank in effect creates or destroys money.

A transaction is a collection of actions that conform to a set of properties (referred to as the "ACID" properties) which include atomicity, consistence isolation, and durability. Atomicity means that all activities in a transaction either take effect together as a unit, or all fail. Consistency means that after a transaction executes, the system is left in a stable or correct state (i.e., if giving effect to the activities in a transaction would not result in a correct stable state, the system is returned to its initial pre-transaction state). Isolation means the transaction is not affected by any other concurrently executing transactions (accesses by transactions to shared resources are serialized, and changes to shared resources are not visible outside the transaction until the transaction completes). Durability means that the effects of a transaction are permanent and survive system failures. For additional background information on transaction processing, see, inter alia, Jim Gray and Andreas Reuter, *Transaction Processing Concepts, and Techniques*, Morgan Kaufmann, 1993.

Prior patent applications also assigned to the assignee of the current invention (namely, Helland et al., "Automatic Transaction Processing Of Component-Based Server Applications," U.S. patent application Ser. No. 08/959,141; and Helland et al., "Disabling And Enabling Transaction Committal In Transactional Application Components," U.S. patent application Ser. No. 08/959,142, both filed Oct. 28, 1997; which the present application hereby incorporates by reference and hereafter refers to collectively as the "incorporated MTS Patent Applications") disclose an execution e,environment and platform for distributed server applications, which is embodied in the Microsoft Transaction Server (MTS) version 1.0 product. MTS provides a component-based framework or object model with system services to support transactions by potentially distributed groups of components of server applications under control of a transaction manager, such as the Microsoft Distributed Transaction Coordinator (MS DTC).

In the MTS, server applications use resource managers to maintain the durable state of the application, such as the record of inventory on hand, pending orders, and accounts receivable. Resource managers are a system service that manages durable data, such as may be contained in databases, durable message queues, file systems or other data storage resources. One example is the resource manager provided with the Microsoft SQL Server version 6.5. Resource managers operate in cooperation with the transaction manager to enforce the ACID properties on the durable data of the managed resource.

Resource managers are difficult to develop and implement for a particular resource (e.g., durable data store). This is because a resource manager deals with a number of the more complex issues in transaction processing. Specifically, the resource manager must properly interface with the transaction manager, and guarantee that all operations requested to be done by components on the managed resource adhere to the ACID transactional properties. The resource manager thus must ensure that all updates to the durable data by components that are completed under a specific transaction are made durable when the transaction commits, or are rolled back if the transaction aborts. The resource manager employs transaction-based synchronization protocols to isolate uncommitted work of active transactions. The resource manager also must ensure thread safety, which means the resource manager must be capable of being called by application components from any thread. The resource manager must further provide logging and recovery so that transactions involving the resource are durable over crashes and other failures (communications failures, process failures, and storage medium failures, as well as server system failures).

Further, an MTS Resource Manager (a resource manager that has been written to support MTS) must meet some additional requirements. In particular, an MTS Resource Manager implements all (or a substantial subset) of the "OLE Transactions" interfaces, which allow integration into MTS and interface to the MS DTC. Additionally, an MTS Resource Manager must provide a resource dispenser (a service that provides pooling and automatic transaction enlistment for MTS server application components) for their managed resource. If there is no Resource Dispenser, then an alternative mechanism for automatic transaction enlistment must be provided.

Due to these difficulties, few resource managers are yet available for MTS (the Microsoft SQL Server version 6.5 previously mentioned being one example). However, a wide variety of resources with no transaction support are currently available on the market, and deployed in use. Further, there are a variety of resource managers (herein referred to as legacy resource managers) for other transactional systems that don't provide the required interfaces (i.e., the OLE transactions interfaces) to interoperate in MTS, such as to interface to the MS DTC. For example, a number of travel industry reservations systems have reservations databases managed under the IBM CICS transactional system. It is therefore desirable to integrate such non-transactional resources and legacy resource managers into MTS more easily than implementing an MTS resource manager specific to each.

The present invention provides a form of resource management (herein referred to as "compensation" or "compensating resource management") that allows durable resources to be more easily integrated into a transactional system, and particularly into a component-based on-line transaction processing application environment such as MTS. In compensating resource management, a durable resource is integrated to participate in transactions under the transactional system by providing a compensating action to reverse each normal action performed on the resource gas part of a transaction. The normal action is persisted on the resource at the time of request. In a case where the transaction aborts, the compensating action is invoked outside of the transaction to return the durable resource to its pre-transaction state. For durability, information identifying the compensating action to be taken for each normal action performed during a transaction is written to a log on a write-ahead basis. Thus, in the case of a failure, recovery can be performed in accordance with the status of the transaction. in a component-based on-line transaction processing application environment such as MTS, compensating resource management can be provided for, a particular durable resource by implementing a compensating resource manager (CRM). In the CRM, a developer implements a compensating action for each normal action that the CRM supports on the durable resource. The developer also implements the CRM to perform write-ahead logging in connection with each normal action to specify the compensating action for that normal action.

In accordance with one embodiment of the invention illustrated herein (the illustrated embodiment), the CRM is developed as a pair of components, a CRM worker and a CRM compensator which share state (i.e., data) only through the medium of the log. The CRM worker performs the normal action at the time of request by a server application as a part of a transaction for the server application. This action and an interface through which the, action is accessed by the server application are specific to the particular CRM. When the server application invokes the normal action via the interface, the CRM worker also writes a log record to a system-provided log which identifies the CRM compensator.

The CRM compensator implements the compensating action corresponding to the CRM worker's normal action. The CRM compensator that was designated by the CRM worker is later created to participate in later phases of the two phase commit protocol (e.g., Phase 1 and Phase 2) by taking appropriate further actions in relation to the normal action logged by the CRM worker. The CRM compensator supports a system-defined interface by which it receives two phase commit protocol notifications (e.g., prepare, commit and abort notifications) from the transaction manager (by way of a log recovery manager in the illustrated embodiment). These notifications allow the CRM compensator to participate in these phases of the two phase commit protocol.

More specifically, during the prepare phase, the CRM compensator can vote against committal of the transaction and force an abort in response to the prepare notification (e.g., by returning a value to vote "No" in response to the prepare notification). The commit notification affords the CRM compensator an opportunity to perform clean-up processing after the normal action of the CRM worker. This clean-up processing is the removal of any state (durable or non-durable) that is being maintained for purposes of compensating for an aborted transaction. The commit notification also affords the compensator the opportunity to do any work that is irreversible. For example, in an ATM transaction, an account balance may be debited and cash dispensed. It is undesirable to dispense cash unless the debit is guaranteed to occur. With a CRM that manages the ATM, a CRM compensator would vote "yes" in response to a prepare notification as long as there is physically enough cash in the ATM. Then, in response to the commit notification, the CRM compensator causes the ATM to actually dispense the cash. In response to the abort notification, the CRM compensator performs the compensating action to reverse the CRM worker's normal action. Accordingly, during normal processing of a transaction, the CRM compensator participates in the transaction prepare phase, and is notified of the transaction outcome. The CRM compensator can then clean up on commit, or compensate on abort. During recovery, on the other hand, the CRM compensator is again created and informed of the transactions outcome based on the log, allowing the CRM compensator to complete transaction processing (as appropriate) involving the resource as if there had net been a failure. For example, if Phase 1 was not complete before a system crash, the transaction is aborted and the CRM compensator is delivered an abort notification.

In the embodiment illustrated herein, each action (defined as the work done during a transaction, or set of log records) implemented by the CRM compensator, including particularly the compensating action, must be idempotent. This means that the CRM compensator's action on a commit or abort of the transaction can be attempted any number of times, and if the action ever succeeds, the action achieves the same result as if the action had succeeded on its first attempt.

Additional features and advantages of the invention will be made apparent from the following detailed description of an illustrated embodiment which proceeds with reference to the accompanying drawings.

BRIEF DESCRIPTION OF THE DRAWINGS

FIG. 6 is a program listing of an "ICrmLogControl" interface on a CRM clerk in the compensating resource manager architecture of FIG. 3.

FIG. 7 is a program listing of data structures for an "ICrmCompensator" interface of a CRM compensator in the compensating resource manager architecture of FIG. 3.

FIG. 8 is a program listing of an "ICrmCompensatorVariants" interface of the CRM compensator in the compensating resource manager architecture of FIG. 3.

FIG. 9 is a program listing of an "ICrmCompensator" interface of the CRM compensator in the compensating resource manager architecture of FIG. 3.

FIG. 10 is a program listing of an "ILogRecover" interface of a recovery engine in the compensating resource manager architecture of FIG. 3.

FIG. 11 is a program listing of an "ILogRecoverClerk" interface of a CRM recovery clerk and the CRM clerk in the compensating resource manager architecture of FIG. 3.

FIG. 13 is a program listing of an "ILogRecoverClerkRegistration" interface of the recovery engine in the compensating resource manager architecture of FIG. 3.

FIG. 14 is a program listing of an "ILog" interface of a log object for a persistent log in the compensating resource manager architecture of FIG. 3.

FIG. 15 is a program listing of an "ICrmFormatLogRecords" interface in the compensating resource manager architecture of FIG. 3.

FIG. 16 is a program listing of an "ICrmMonitorLogRecords" interface of the CRM clerk in the compensating resource manager architecture of FIG. 3.

FIG. 17 is a program listing of an "ICrmMonitorClerks" interface of a clerks collection object in the compensating resource manager architecture.

FIG. 18 is a program listing of an "ICrmMonitor" interface" of the CRM recovery clerk in the compensating resource manager architecture of FIG. 3.

DETAILED DESCRIPTION OF THE ILLUSTRATED EMBODIMENTS

The present invention is directed toward methods, systems, and software products for compensating resource management in on-line transaction processing. In one embodiment illustrated herein, the invention is incorporated into operating software for server applications on distributed computing systems, entitled "COM+" which is part of the "Microsoft Windows NT Server 5.0" operating system by Microsoft Corporation of Redmond, Wash. Briefly described, this software provides a component framework and run-time execution environment for server applications that, among other things, includes system services to support transaction processing using a two phase commit protocol on distributed computing systems.

Exemplary Operating Environment

Figure 1:
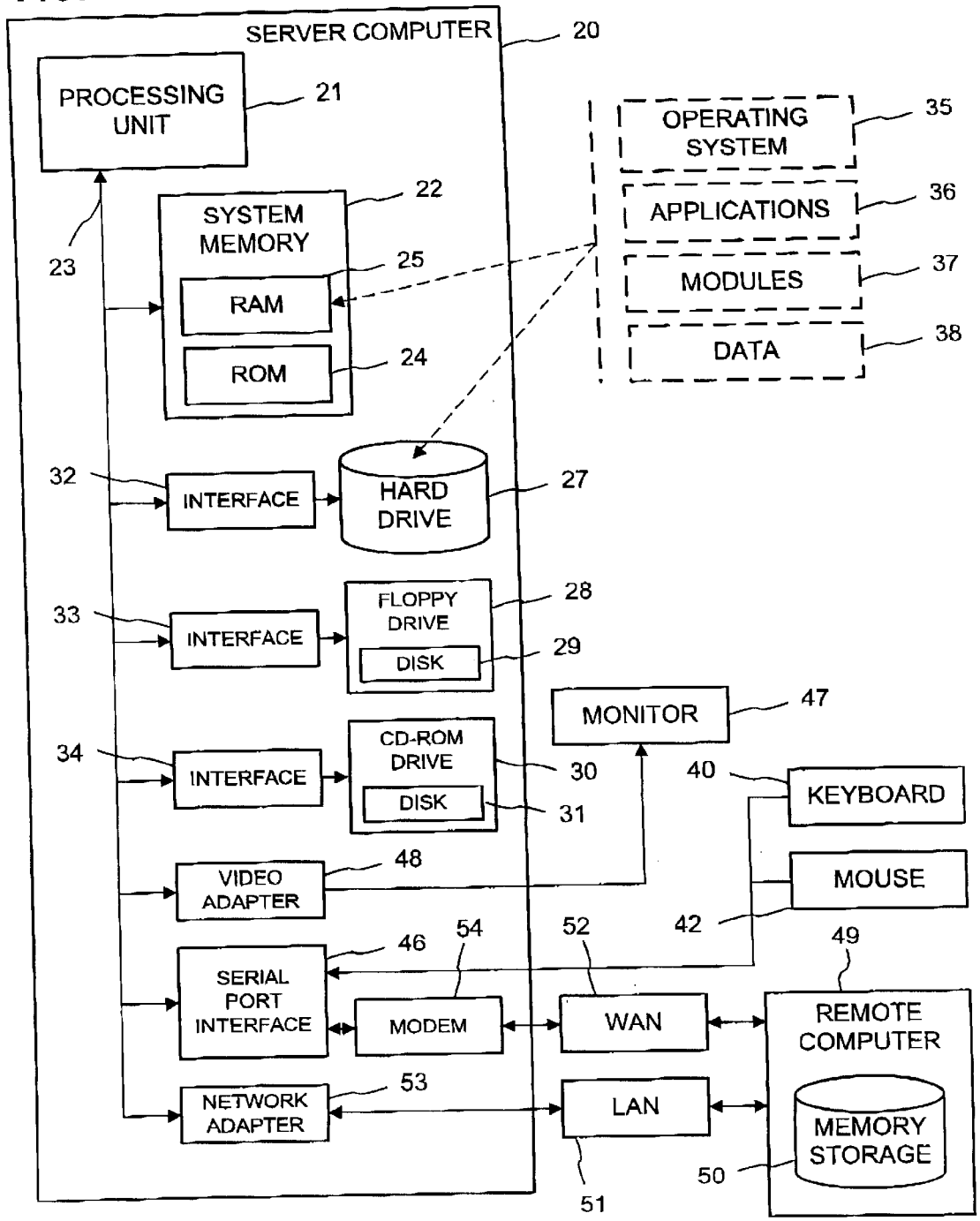
FIG. 1 is a block diagram of a distributed computer system that may be used to implement a method and apparatus embodying the invention for compensating resource management in an on-line transaction processing system.

FIG. 1 and the following discussion are intended to provide a brief, general description of a suitable computing environment in which the invention ray be implemented. While the invention will be described in the general context of computer-executable instructions of a computer program that runs on a server computer, those skilled in the art will recognize that the invention also may be implemented in combination with other program modules. Generally, program modules include routines, programs, components, data structures, etc. that perform particular tasks or implement particular abstract data types. Moreover, those skilled in the art will appreciate that the invention may be practiced with other computer system configurations, including single- or multiprocessor computer systems, minicomputers, mainframe computers, as well as personal computers, handheld computing devices, microprocessor-based or programmable consumer electronics, and the like. The illustrated embodiment of the invention also is practiced in distributed computing environments where tasks are performed by remote processing devices that are linked through a communications network. But, some embodiments of the invention can be practiced on stand-alone computers. In a distributed computing environment, program modules may be located in both local and remote memory storage devices.

With reference to FIG. 1, an exemplary system for implementing the invention includes a conventional server computer 20, including a processing unit 21, a system memory 22, and a system bus 23 that couples various system components including the system memory to the processing unit 21. The processing unit may be any of various commercially available processors, including Intel x86, Pentium and compatible microprocessors from Intel and others, including Cyrix, AMD and Nexgen; Alpha from Digital; MIPS from MIPS Technology, NEC, IDT, Siemens, and others; and the PowerPC from IBM and Motorola. Dual microprocessors and other multi-processor architectures also can be used as the processing unit 21.

The system bus may be any of several types of bus structure including a memory bus or memory controller, a peripheral bus, and a local bus using any of a variety of conventional bus architectures such as PCI, VESA, Microchannel, ISA and EISA, to name a few. The system memory includes read only memory (ROM) 24 and random access memory (RAM) 25. A basic input/output system (BIOS), containing the basic routines that help to transfer information between elements within the server computer 20, such as during start-up, is stored in ROM 24.

The server computer 20 further includes a hard disk drive 27, a magnetic disk drive 28, e.g., to read from or write to a removable disk 29, and an optical disk drive 30, e.g., for reading a CD-ROM disk 31 or to read from or write to other optical media. The hard disk drive 27, magnetic disk drive 28, and optical disk drive 30 are connected to the system bus 23 by a hard disk drive interface 32, a magnetic disk drive interface 33, and an optical drive interface 34, respectively. The drives and their associated computer, readable media provide nonvolatile storage of data, data structures computer-executable instructions, etc. for the server computer 20. Although the description of computer-readable media above refers to a hard disk, a removable magnetic disk and a CD, it should be appreciated by those skilled in the art that other types of media which are readable by a computer, such as magnetic cassettes, flash memory cards, digital video disks,. Berlnoulli cartridges, and the like, may also be used in the exemplary operating environment.

A number of program modules may be stored in the drives and RAM 25, including an operating system 35, one or more application programs 36, other program modules 37, and program data 38. The operating system 35 in the illustrated server computer is the Microsoft Windows NT Server operating system, together with the before mentioned Microsoft Transaction Server.

A user may enter commands and information into the server computer 20 through a keyboard 40 and pointing device, such as a mouse 42. Other in, put devices (not shown) may include a microphone, joystick, game pad, satellite dish, scanner, or the like. These and other input devices are often connected to the processing unit 21 through a serial port interface 46 that is coupled to the system bus, but may be connected by other interfaces, such as a parallel port, game port or a universal serial bus (USB). A monitor 47 or other type of display device is also connected to the system bus 23 via an interface, such as a video adapter 48. In addition to the monitor, server computers typically include other peripheral output devices (not shown), such as speakers and printers.

The server computer 20 may operate in a networked environment using logical connections to one or more remote computers, such as a remote client computer 49. The remote computer 49 may be a workstation, a server computer, a router, a peer device or other common network node, and typically includes many or all of the elements described relative to the server computer 20, although only a memory storage device 50 has been illustrated in FIG. 1. The logical connections depicted in FIG. 1 include a local area network (LAN) 51 and a wide area network (WAN) 52. Such networking environments are commonplace in offices, enterprise-wide computer networks, intranets and the Internet.

When used in a LAN networking environment, the server computer 20 is connected to the local network 51 through a network interface or adapter 53. When used in a WAN networking environment, the server computer 20 typically includes a modem 54, or is connected to a communications server on the LAN, or has other means for establishing communications over the wide area network 52, such as the Internet. The modem 54, which may be internal or external, is connected to the system bus 23 via the serial port interface 46. In a networked environment, program modules depicted relative to the server computer 20, or portions thereof, may be stored. in the remote memory storage device. It will be appreciated that the network connections shown are exemplary and other means of establishing a communications link between the computers may be used.

In accordance with the practices of persons skilled in the art of computer programming, the present invention is described below with reference to, acts and symbolic representations of operations that are performed by the server computer 20, unless indicated otherwise. Such acts and operations are sometimes referred to as being computer-executed. It will be appreciated that the acts and symbolically represented operations include the manipulation by the processing unit 21 of electrical signals representing data bits which causes a resulting transformation or reduction of the electrical signal representation, and the maintenance of data bits at memory locations in the memory system (including the system memory 22, hard drive 27, floppy disks 29, and CD-ROM 31) to thereby reconfigure or otherwise alter the computer system's operation, as well as other processing of signals. The memory locations where data bits are maintained are physical locations that have particular electrical, magnetic, or optical properties corresponding to the data bits.

Overview Of The MTS Programming Model

Figure 2:
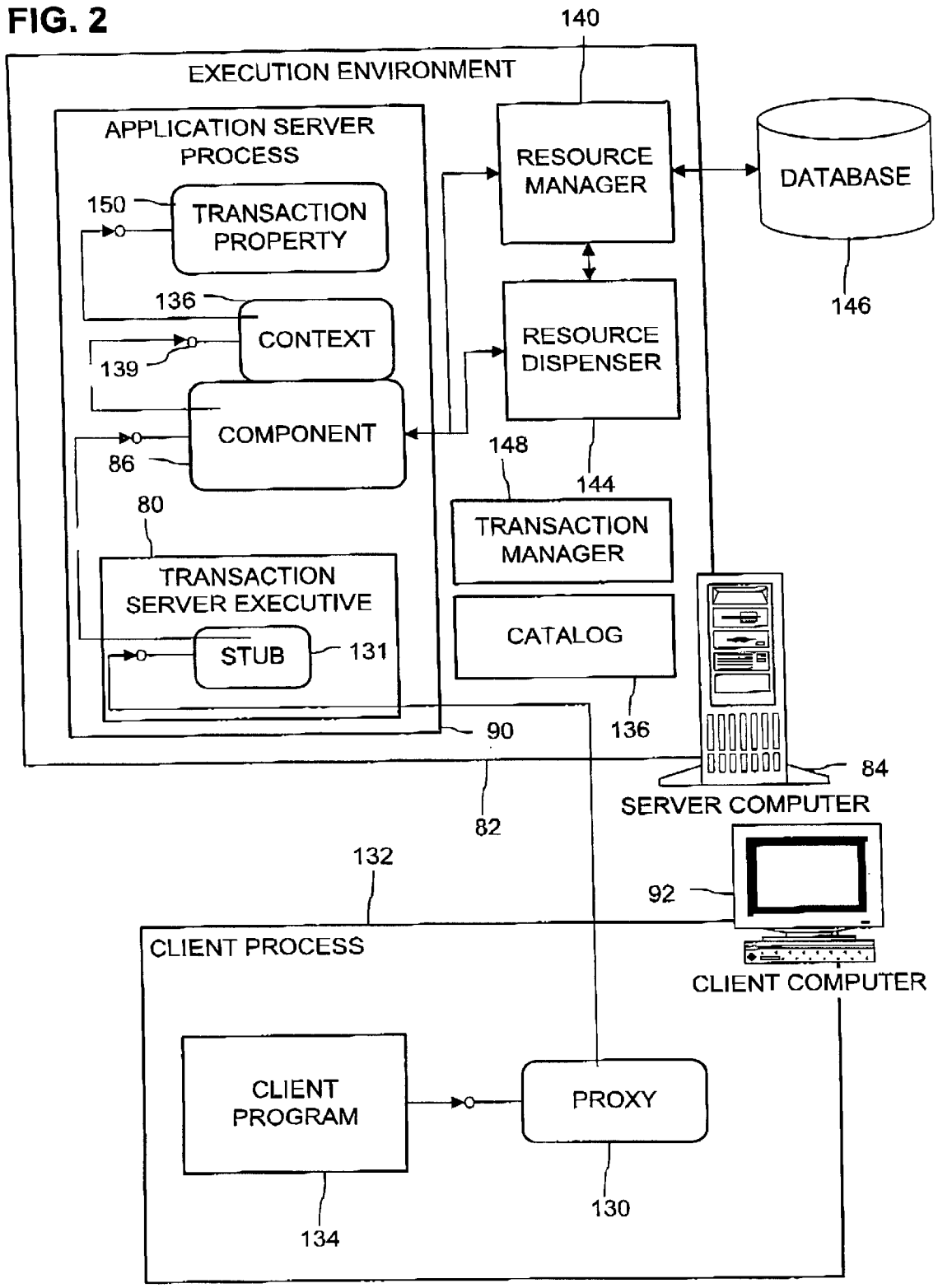
FIG. 2 is a block diagram of a server application execution environment with services for transaction processing with compensating resource management according to the illustrated embodiment of the invention.

FIG. 2 depicts a server application execution environment 82 of the Microsoft Transaction Server (MTS) in which compensating resource management according to the invention is incorporated. The MTS execution environment 82 is described in more detail in the above incorporated MTS Patent Applications.

With reference now to FIG. 2, a transaction server executive 80 provides run-time or system services to create the run-time execution environment 80 that supports on-line transaction processing by server application components (e.g., server application component 86) on a server computer 84. The transaction server executive 80 also provides services for thread and context management to the server application components 86. Additionally, the transaction server executive 80 provides system-defined objects (including a component context object 136) that support component integration interfaces. The illustrated transaction server executive 80 is implemented as a dynamic link library ("DLL"). (A DLL is a well-known executable file format which allows dynamic or run-time linking of executable code into an application program's process) The transaction server executive 80 is loaded directly into application server processes (e.g., "ASP" 90) that host server application components, and runs transparently in the background of these processes.

The illustrated ASP 90 is a system process that hosts execution of server application components. Each ASP 90 can host multiple server application components that are grouped into a collection called a "package." Also, multiple ASPs 90 can execute on the server computer under a multi-threaded, multi-tasking operating system (e.g., Microsoft Windows NT in the illustrated embodiment). Each ASP 90 provides a separate trust boundary and fault isolation domain for the server application components. In other words, when run in separate ASPs, a fault by one server application component which causes its ASP to terminate generally does not affect the server application components in another ASP. In the illustrated embodiment, server application components are grouped as a package to be run together in one ASP 90 using an administration utility called "the COM Explorer." This utility provides a graphical user interface for managing attributes associated with server application components, including grouping the components into packages.

In a typical installation shown in FIG. 2, the execution environment 80 is on the server computer 84 (which may be an example of the computer 20 described above) that is connected in a distributed computer network comprising a large number of client computers 92 which access the server application components in the execution environment. Alternatively, the execution environment 80 may reside on a single computer and host server application components accessed by client processes also resident on that computer.

The server application components 86 that are hosted in the execution environment 80 of the ASP 90 implement the business logic of a server application, such as the code to manage class registrations in a university's registration application or orders in an on-line sales application. Typically, each server application comprises multiple components, each of which contains program code for a portion of the application's work. For example, a banking application may comprise a transfer component, a debit account component, and a credit account component which perform parts of the work of a money transfer operation in the application. The debit account component in this banking application example implements program code to debit a specified account in a banking database by a specified amount. The credit account component implements program code to credit a specified account in the database by a specified amount. The transfer component implements program code that uses the debit account component and credit account component to effect a money transfer between two accounts.

The server application component 86 in the illustrated embodiment conforms to the Component Object Model ("COM") of Microsoft Corporation's OLE and ActiveX specifications (i.e., is implemented as a "COM Object"), but alternatively may be implemented according to other object standards including the CORBA (Common Object Request Broker Architecture) specification of the Object Management Group. OLE's COM specification defines binary standards for components and their interfaces which facilitate the integration of software components. By convention, the interfaces of a COM object are illustrated graphically as a plug-in jack as shown for the server application component 86 in FIG. 2. Also, interfaces conventionally are given names beginning with a capital "I." For a detailed discussion of OLE, see Kraig Brockschmidt, Inside OLE, Second Edition, Microsoft Press, Redmond, Wash., 1995.

In the execution environment 80 of FIG. 2, the server application component 86 is executed under control of the transaction server executive 80 in the ASP 90. The transaction server executive 80 is responsible for loading the server application DLL 300 into the ASP 90 and instantiating the server application component 86 using the class factory 122. The transaction server executive 80 further manages calls to the server application component 86 from client programs (whether resident on the same computer or over a network connection).

The illustrated execution environment 80 imposes certain additional requirements on the server application component 86 beyond conforming with COM requirements. First, the server application component is implemented in a DLL file (i.e., the server application DLL 120 of FIG. 3). (COM objects otherwise alternatively can be implemented in an executable (".exe") file.) Second, the component's DLL file 120 has a standard class factory 122 (i.e., the DLL implements and exports the DllGetClassObject method, and supports the IClassFactory interface). Third, the server application component exports only interfaces that can be standard marshaled, meaning the component's interfaces are either described by a type library or have a proxy-stub DLL. The proxy-stub DLL provides a proxy component 130 in a client process 132 on the client computer 92, and a stub component 131 in the ASP 90 on the server computer 84. The proxy component 130 and stub component 131 marshal calls from a client program 134 across to the server computer 84. The proxy-stub DLL in the illustrated system is built using the MIDL version 3.00.44 provided with the Microsoft Win32 SDK for Microsoft Windows NT 4.0 with the Oicf compiler switch, and linked with the transaction server executive 80. These additional requirements conform to well known practices.

The client program 134 of the server application component 86 is a program that uses the server application component. The client program can be program code (e.g., an application program, COM Object, etc.) that runs outside the execution environment 80 (out of the control of the transaction server executive 80). Such client programs are referred to as "base clients." Alternatively, the client program 134 can be another server application component that also runs under control of the transaction server executive (either in the same or a separate ASP 90). The client program 134 can reside on the server computer 84 or on a separate client computer 92 as shown in FIG. 2 (in which case the client computer interacts with the server application component 86 remotely through the proxy object 130 and stub object 131).

The server computer 84 also runs a resource manager 140 and a resource dispenser 144. The resource manager 140 is a system service that manages durable data (e.g., data in a database 146). The server application component 86 can use the resource manager to maintain the durable state of the server application (such as, the record of inventory on hand, pending orders, and accounts receivable in an on-line sales server application). Examples of resource managers in the illustrated embodiment include the Microsoft SQL Server, durable message queues, and transactional file systems. Preferably, the resource manager 140 supports performing changes or updates by the server application component 86 to the server application's durable state on a transactional basis (i.e., in transactions conforming to the well-known ACID properties).

The resource dispenser 144 is a service that manages nondurable shared state (i.e., without the guarantee of durability) on behalf of the server application components within the ASP 90. Resource dispensers also are responsible for automatic transaction enlistment in the illustrated execution environment, as described in the above incorporated MTS Patent Applications. Examples of the resource dispenser 144 in the illustrated embodiment include an ODBC resource dispenser that maintains a pool of database connections conforming to the Microsoft Open Database Connectivity ("ODBC") call level interface. The ODBC resource dispenser allocates database connections to the server application component for accessing data from a database 146 (generally, through its resource manager 140). Also, the ODBC resource dispenser reclaims database connections when released by the server application components for later reuse.

The illustrated execution environment 82 further includes a transaction manager 148. The transaction manger 148 is a system service that coordinates transactions that span multiple resource managers, including where the resource managers reside on more than one server computer in a distributed network. The transaction manager 148 ensures that updates across all resources managers involved in a transaction occur in conformance with the ACID properties using the well known two-phase commit protocol, regardless of failures (e.g., computer or network hardware or software failures, or errors caused by a misbehaved resource manager or application), race conditions (e.g., a transaction that starts to commit while one resource manager initiates an abort), or availability (a resource manager prepares a transaction but never returns). The illustrated transaction manager 148 is the Microsoft Distributed Transaction Coordinator (MSDTC) released as part of Microsoft SQL Server 6.5.

The Compensating Resource Manager Architecture

Figure 3:
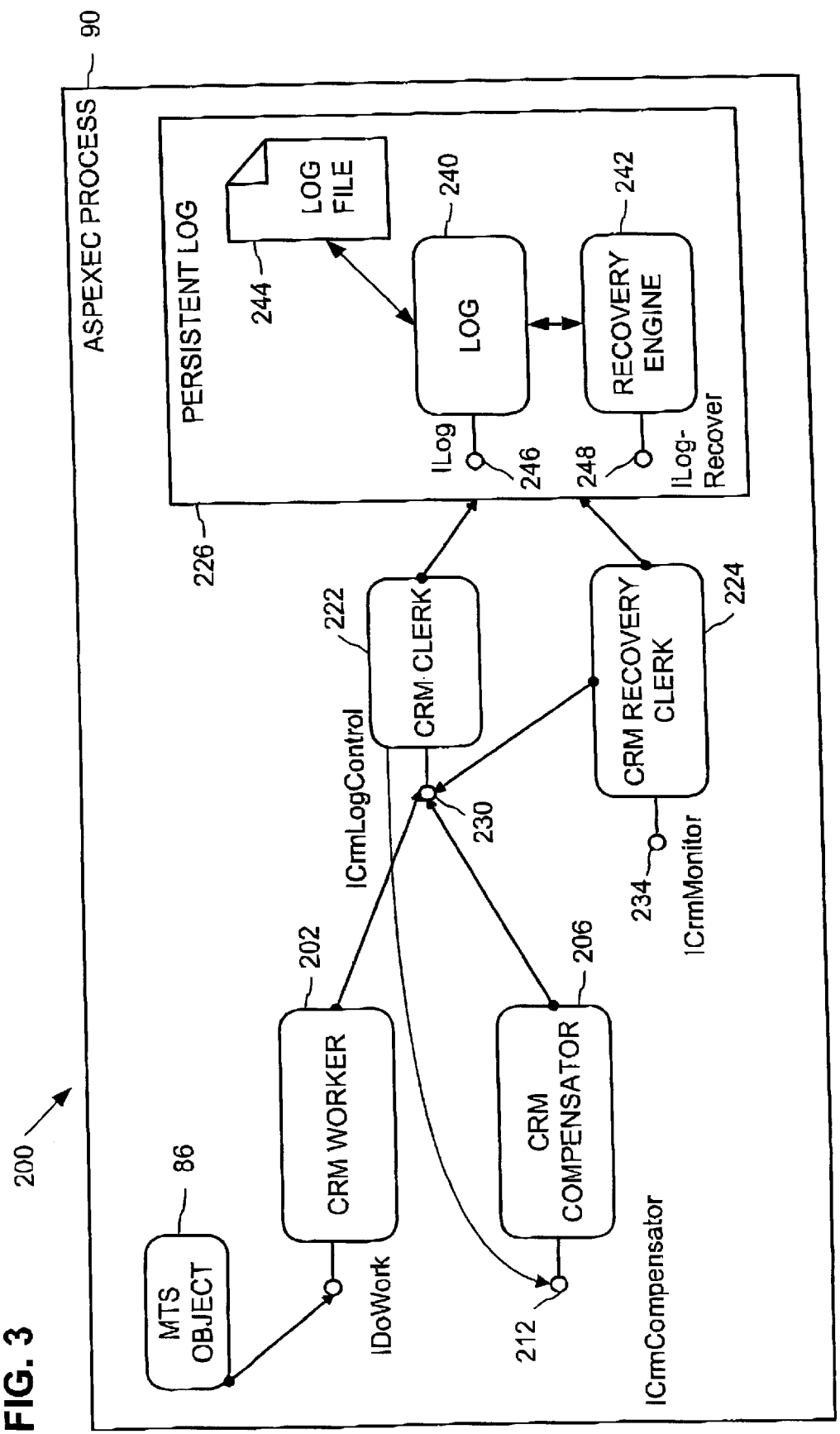
FIG. 3 is a block diagram of a component-based architecture of a compensating resource manager. (CRM) operable in the server application execution environment of FIG. 2 to provide compensating resource management according to the illustrated embodiment of the invention.

With reference now to FIG. 3, a component or object-based architecture 200 of a compensating resource manager (CRM) includes a number of system-provided components and system-defined interfaces that allow developers to more rapidly and easily integrate resources with durable data storage into the MTS execution environment 82 (FIG. 2), without having to implement a full resource manager and resource dispenser specific to the resource (e.g., resource manager 140 and resource dispenser 144 of FIG. 2). The illustrated architecture 200 is particularly applicable to two resource scenarios, namely (1) a legacy or black box transaction processing system that has its own internal mechanism to deal with transactions but does not support the OLE transactions interfaces, and (2) resources with no transactional support. The architecture 200 allows easier integration into the MTS environment 82 (FIG. 2) in the former scenario by providing a resource manager infrastructure with support for the OLE transactions interfaces, and eliminating the necessity of having a resource dispenser for the resource manager. Further, the architecture 200 allows the resources in each scenario to be integrated with a simpler, easier to develop resource manager through use of compensating resource management according to the invention.

In the illustrated compensating resource manager architecture 200, the developer need implement only a CRM worker 202 and a CRM compensator 206 that utilize the system-provided components and interfaces of the architecture 200 to provide compensating resource management of the resource. The CRM worker 202 and CRM compensator 206 are components conforming to the COM object model. The CRM worker 202 and CRM compensator 206 typically are installed into an MTS library package so that they may be used in any MTS server process (e.g., ASP 90).

In the CRM worker 202, the developer implements logic (i.e., program code) specific to the resource to perform a normal action on the resource as part of a transaction. The developer also implements a resource-specific interface (e.g., the "IDoWork" interface 210) to which a server application component 86 can issue calls to cause the CRM worker 202 to perform the normal action on the resource. The CRM worker 202 enacts the normal action on the resource at the time of the server application component's request, such that the results of the normal action are persistent on the resource immediately after the request.

On the other hand, the developer implements logic in the CRM compensator 206 that provides compensating actions related to the normal action of the CRM worker 202. The developer further implements the CRM compensator 206 to support a system-defined interface (the "ICompensatingResourceManager" interface 212) by which the CRM compensator receives prepare, commit and abort notifications from the transaction manager 148 (FIG. 2). These notifications from the transaction manager are delivered to the CRM compensator by way of system-provided infrastructure, a recovery engine and a CRM clerk described below. During the prepare phase of a transaction in which the CRM worker 202 has performed its normal action, the CRM compensator can cause the transaction to abort in response to the prepare notification, such as where circumstances would prevent successful completion of the transaction. In the second phase of the transaction, the CRM compensator can respond to a commit notification by performing clean-up actions appropriate to the normal action of the CRM worker on the resource. Alternatively, the CRM compensator can respond to an abort notification by performing a compensating action that reverses the normal action of the CRM worker.

The normal, clean-up and compensating actions of the CRM worker and compensator generally vary depending on the specific durable resource being managed. Where the resource is a file system or database for example, the actions can include data processing activities, such as modifying data, writing new data, or deleting data from the resource. In the case of some resources, the CRM compensator's clean-up and/or compensating actions can include activities in addition to data processing, such as dispensing cash, tickets, or other items from an ATM or other automated dispensing machine, which may have irreversible real-world results (such operation having irreversible physical world consequences being referred to herein as "real operations").

Additional components of the CRM architecture 200 are incorporated into the MTS run-time environment and services, and are thus "system-provided." This allows the developer to implement only the CRM worker and CRM compensator that are specific to a particular resource, and rely on these system-provided components to provide services to deal with issues such as logging, recovery, and thread safety. The system-provided components of the illustrated architecture 200 include a CRM clerk 222, a CRM recovery clerk 224, and a persistent log 226. Each of these also are implemented as COM components. All of these components are run within the application server process (ASP) 90 (also shown in FIG. 2).

The CRM architecture 200 provides thread safety in that the system-provided components of the architecture are individually thread safe, meaning they can be called from any thread. Further, the CRM architecture 200 supports all of the OLE transactions interfaces required to interface with MTS. The CRM architecture 200 does not assume that the consumers of the architecture's functionality (i.e., the server application components 86) are themselves thread safe. The CRM architecture 200 guarantees to make all. calls into the CRM compensator in the same apartment in which the CRM compensator was created according to standard COM programming practices. In other words, the CRM architecture assumes that its consumers are at least apartment model components (a well known threading model).

The CRM clerk 222 and CRM recovery clerk 224 provide logging and recovery services in the architecture 200. During normal operation, each CRM worker 202 will create its own instance of a CRM clerk (i.e., there is a one-to-one relationship of CRM worker to CRM clerk). The CRM worker 202 accesses the CRM clerk 222 through a system-defined interface, the ICrmLogControl interface 230, to queue information that is to be logged in the persistent log 226. The CRM clerk will add additional information to the log records before they are written to the log. During normal processing, the CRM clerk 222 also is responsible for instantiating the CRM compensator and passing two phase commit notifications to the CRM compensator, as needed.

The CRM recovery clerk 224 operates as a log and recovery manager, that is common to all compensating resource managers on the computer system. The CRM recovery clerk 224 is a singleton COM component, meaning there is only ever one instance of the CRM recovery clerk in the ASP 90. The CRM recovery clerk 224 performs the initial recovery on the persistent log 226, which is automatically initiated when the MTS server process (e.g., ASP 90) that hosts the CRM components starts up. Thereafter, the CRM recovery clerk 224 remains active to initiate checkpoints on the log, and to provide a central point through which CRM clerks are monitored.

The CRM recovery clerk 224 supports an "ICrmMonitor" interface 234, which is obtained by calling the "CoCreateInstance( )" API method with the CRM recovery clerk's CLSID. The "ICrmMonitor" interface is defined in the program listing 320 shown in FIG. 18. The "ICrmMonitor" interface 234 is used to monitor which transactions are currently in-progress for the CRMs in the ASP 90 (such as by a program or COM component that provides user displays or dialogs for a human operator or administrator). The text descriptions provided by the CRM worker when registering the CRM compensator (see the "Registercompensator( )" method described below) are available to aid in searching for a particular CRM activity.

The "ICrmMonitor" interface provides a method ("GetClerks( )") to obtain an interface pointer to an "ICrmMonitorClerks" interface on a clerks collection object that tracks the CRM clerks 222 of the compensating resource manager architecture 200. The "ICrmMonitorClerks" interface is defined in the program listing 319 shown in FIG. 17. Through this interface, a pointer to an "ICrmMonitorLogRecords" interface supported on the CRM clerk 222 can be obtained. The "ICrmMonitorLogRecords" interface is used to monitor the individual log records maintained by a specific CRM clerk for a given transaction, such as for human recovery described below. The "ICrmMonitorLogRecords" is defined in the program listing 318 shown in FIG. 16.

Each ASP 90 that uses the CRM will have its own associated persistent log 226 to store log records. The persistent log 226 in the illustrated CRM architecture 200 is a TXF format log file, which has a file name based on the AppId associated with the ASP 90. When writing log records (in response to the "ForceLog( )" method described below), the CRM clerk 222 writes log records in a sequential order into the persistent log 226. The CRM recovery clerk 224 also periodically initiates check points in the persistent log 226 to reclaim space from log records freed after completed transactions.

The CRM worker 202 logs sufficient information into the persistent log 226 (through the CRM clerk 222 and CRM recovery clerk 224, as just described) typically, but not necessarily, on a write-ahead basis as it performs its normal action to the resource on behalf of the server application component 86, so that the CRM architecture 200 can cause the CRM compensator 206 to take appropriate actions in response to the two phase commit protocol notifications (e.g., a vote action during prepare, clean-up action on commit, or compensating action on abort). The CRM worker 202 also registers a class identifier ("CLSID") of the CRM compensator 206 with the CRM clerk 222. Later, when the transaction is over (which in the MTS environment is typically in response to a SetComplete or SetAbort call from the server application component(s) 86 in the transaction, as described in the above incorporated MTS Patent Applications), the CRM clerk 222 creates the CRM compensator 206 and calls appropriate methods on its ICrmCompensator (or ICrmCompensatorVariants) interface 212 for each of the two phase commit notifications that it receives from the transaction manager 148 (FIG. 2). With the two phase commit notifications, the CRM clerk 222 delivers individually the log records written by the CRM worker 202 for the transaction-in a forward order for commit and reverse order for abort to preserve the ordering of actions within the transaction. The CRM compensator 206 also can log information of its own compensating actions to the persistent log that may be needed during recovery. The CRM worker 202 and the CRM compensator 206 thus share state only through the persistent log 226.

The persistent log 226 in the illustrated architecture 200 is implemented as a log object 240, a recovery engine 242, and a log file 244. The log object 240 is a COM object that encapsulates a serial stream of log records, and is responsible for stably writing a sequential stream of log records into the log file 244. The log object 240 provides methods for writing and reading the log records from the log file 244 through an "ILog" interface 246, which are used by the CRM clerk 222, the CRM recovery clerk 224 and the recovery engine 242.

The log file 244 is a serial data stream stored in non-volatile memory (e.g., on the hard drive 27 in FIG. 1), such as a file or collection of files of a file system, in which log records are stored. The illustrated log file 244 is a file having the Microsoft TXF file format. Each log record in the illustrated log file 244 is identified by a log sequence number (LSN), which are monotonically increasing 64-bit integers in the serial stream. A separate log file is kept for each ASP 90 on the computer 20 (FIG. 1). In the illustrated architecture 200, the log file 244 is identified by a file name based on an unique identifier associated with the respective ASP 90 (e.g., the "AppId" in the Microsoft Windows NT operating system), and resides on a same file system path as a log of the transaction manager 148. This facilitates recovery based on the log.

The recovery engine 242 is a COM object that provides services through an "ILogRecover" interface 248 and "ILogRecoverClerkRegistration" interface for processing the log records from the log file 244 following a system restart according to a log recovery protocol to effect recovery from failures. The recovery processing implemented in the illustrated recovery engine 242 is based on the well known ARIES log recovery protocol, although another log recovery protocol or a variation thereof can instead be used. (See, C. Mohan, D. Haderle, B. Lindsay, H. Pirahesh and P. Schwarz, ARIES: *A Transaction Recovery Method Supporting Fine-Granularity Locking and Partial Rollbacks Using Write-Ahead Logging*, in Readings In Database Systems, Second Edition (Michael Stonebraker ed. 1994).) The CRM recovery clerk 224 and CRM clerk 222 register with the recovery engine 242 so that log records written by these entities can be provided by the recovery engine 242 during recovery. The recovery engine 242 also enlists with the transaction manager 148 (FIG. 2) on the transaction in which the CRM worker 202 and CRM clerk 222 participate. During normal operation in the architecture 200, the recovery engine 242 receives the two phase commit notifications from the transaction manager 148 and passes the notifications along with log records relating to the transaction to the CRM clerk 222, which acts on the notifications by creating the CRM compensator 206 and initiating the appropriate compensating actions by the CRM compensator 206. The recovery engine 242 enlists on transactions with the transaction manager 148, and receives two phase commit notifications from the transaction manager using the OLE transactions interfaces. The CRM clerk 222 and CRM recovery clerk 224 implement a set of interfaces (including "ILogRecoverClerk," "ILogRecoverClerkRecordsOnTerminate," and "ILogRecoverClerkPhaseNotification" interfaces) on which the clerks receive the two phase commit notifications from the recovery engine 242.

Operating Sequence

Figure 4:
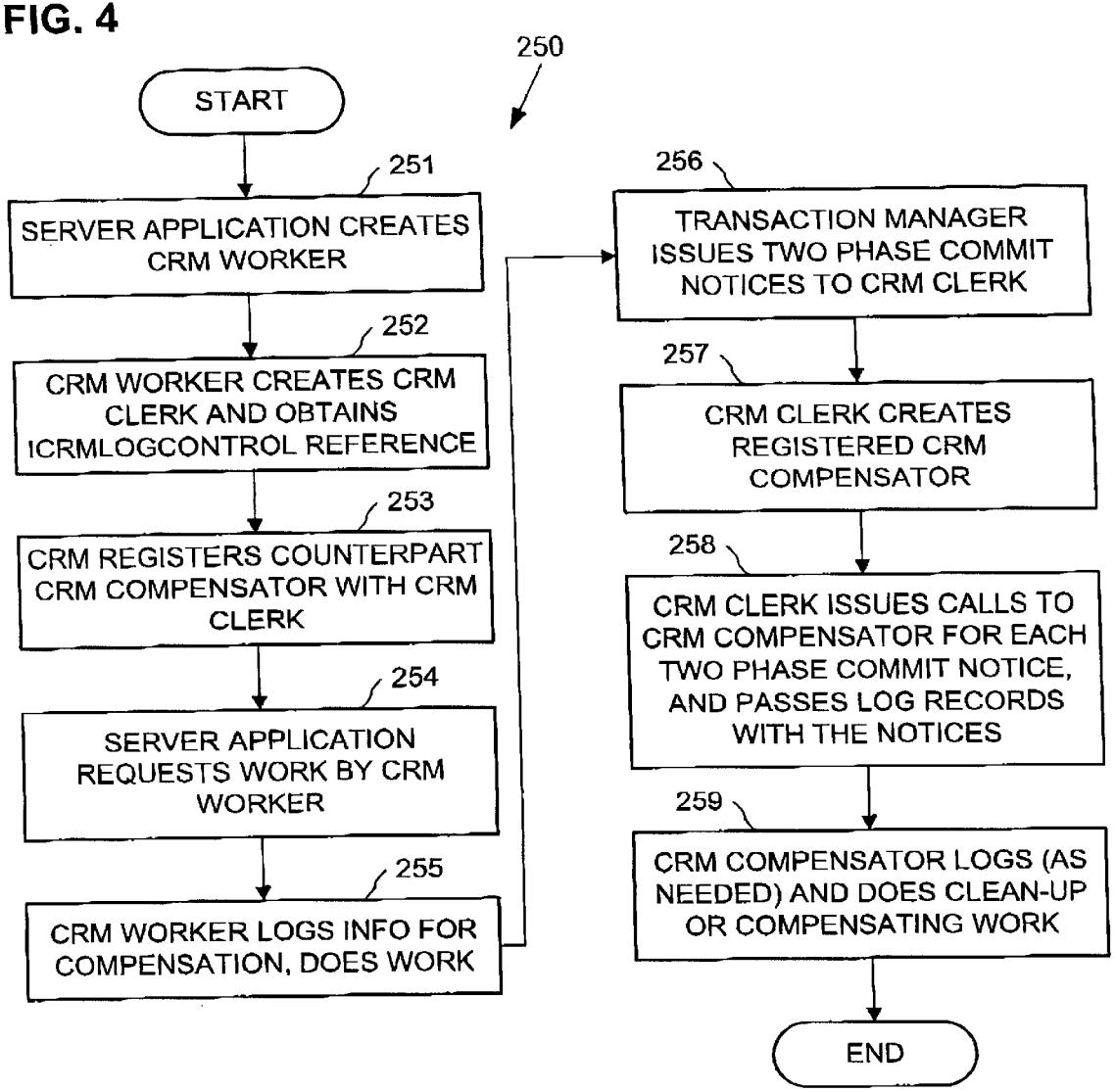
FIG. 4 is a flow diagram of an order of execution within the CRM architecture of FIG. 3.

FIG. 4 depicts an order of execution of the components within the illustrated CRM architecture 200. Initially, the server application component 86 creates the CRM worker 202 using conventional COM object instantiation methodology as indicated at step 251. In a case where the server application component 86 has a transaction, the MTS execution environment 82 will automatically associate the CRM worker 202 in that transaction as described in "Automatic Transaction Processing Of Component-Based Server Applications," U.S. patent application Ser. No. 08/959,141 (incorporated herein above by reference).

At a next step 252, the CRM worker 202 creates an instance of the CRM clerk 222 and obtains an interface reference to the ICrmLogControl interface 230 of the CRM clerk 222 by calling the "CreateInstance( )" method (a well known application programming interface (API) method in the COM run-time services library used for object instantiation) and specifying the CLSID of the CRM clerk and IID of the ICrmLogControl interface. This also automatically associates the CRM clerk instance in the transaction.

After obtaining the ICrmLogControl interface reference, the CRM worker 202 calls a "RegisterCompensator( )"

method of the interface to register the counterpart CRM compensator 206 for the CRM worker 202 with the CRM clerk 222 as shown at step 253. The CRM worker 202 registers the CRM compensator 206 by an identifier of its class (e.g., a program identifier (PROGID) or a class identifier (CLSID)), which under COM provides sufficient identification for the CRM clerk 222 to later create the CRM compensator 206.

In addition, the CRM clerk 222 registers itself with the CRM recovery clerk 224 and the recovery engine 242 using a globally unique identifier (GUID) associated with the specific instance of the CRM clerk class. The CRM recovery clerk 224 logs any active CRM clerks with the log 226 to enable later recreating the CRM clerk at recovery. When the CRM clerk is registered with the recovery engine 242, the recovery engine 242 enlists with the transaction manager 148 on the server application component's transaction. This allows the recovery engine 242 to receive two phase commit notifications issued by the transaction manager in the transaction, and pass the notifications to the CRM clerk 222.

At a next step 254, the server application component 86 requests that the CRM worker 202 perform work on the resource as part of its transaction. As the CRM worker 202 performs the requested work (i.e., its normal action), the CRM worker first logs sufficient information at step 255 to the persistent log 226 using the CRM clerk 222 for the CRM compensator to be able to take appropriate clean-up and compensating actions. As explained below, the CRM worker 202 writes a sequence of log records to the CRM clerk 222 (using the "WriteLogRecord( )" or "WriteLogRecordVariants( )" methods), and then causes the records to be written out to the persistent log on the write-ahead basis before performing the requested work (using the "ForceLog( )" method).

Later, at step 256, the transaction manager 148 issues two phase commit protocol notifications to participants in the transaction (i.e., components enlisted in the transaction), including to the recovery engine 242 which passes the notifications to the CRM clerk 222 along with the log records previously written by the CRM worker 202. Typically, these notifications are sent after the server application component 86 that initiated the transaction has called SetComplete to indicate that all work in the transaction is complete, or a component in the transaction calls SetAbort indicating the work cannot be successfully completed. SetComplete and SetAbort are interface methods of the system-provided context object 136 (FIG. 2), and described in more detail in the above incorporated MTS Patent Applications. The transaction manager 148 issues the two phase commit protocol notifications to the recovery engine 242 on the ITransactionResourceAsync interface 238 (which is part of the OLE transactions interfaces).

In response to each two phase commit protocol notification, the CRM clerk 222 at step 257 creates the CRM compensator 206 that was previously registered by the CRM worker 202 with the CRM clerk 222. At step 258, the CRM clerk 222 then calls an appropriate method of the ICrmCompensator interface 212 to pass the notification and related log records to the CRM compensator 206. With its call to the CRM compensator 206, the CRM clerk 222 passes an interface pointer for the ICrmLogControl interface 230 to allow the CRM compensator to write log records of its compensating actions.

At step 259, the CRM compensator 206 performs the vote, cleanup or compensating action appropriate to the two phase commit protocol notification based on the information logged by the CRM worker 202. As appropriate, the CRM compensator 206 also may log information of its clean-up or compensating actions for use during recovery.

Logging

Figure 5:
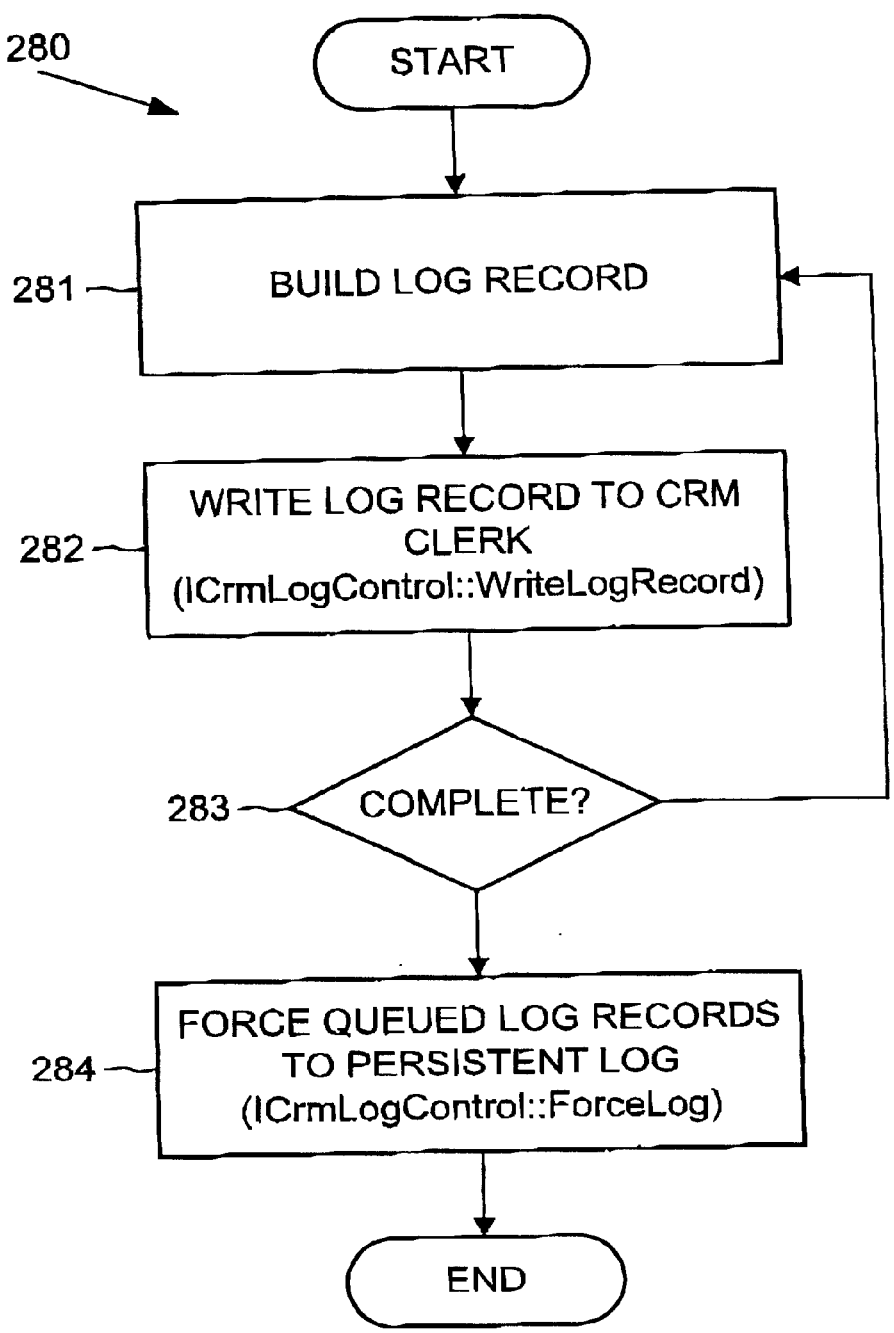
FIG. 5 is a flow diagram of a logging process performed by a CRM worker component in the architecture of FIG. 3.

FIG. 5 depicts a process 280 by which the CRM worker 202 logs information to compensate for its normal action on the resource. IN the illustrated architecture 200 (FIG. 3), information is written to the log in a lazy write fashion. The CRM worker 202 uses the CRM clerk's ICrmLogControl interface 230 to queue up log records that represent one action taken by the CRM worker, which are then forced together to the nonvolatile storage in the log file 244. The CRM worker 202 preferably performs the logging on a write-ahead basis prior to executing any actions on the resource that may later require compensation.

As an initial step 281 of the logging process 280, the CRM worker 202 builds a log record as a collection of data elements. In the illustrated architecture 200, the log record can be structured or unstructured. A structured log record is a collection of Variant-type data elements, such as a Visual Basic collection object. Unstructured log records are simply a buffer of bytes. Typically, a CRM worker written in the Microsoft Visual Basic programming language will write structured log records, while one written in the Microsoft Visual C++ or J++ languages writes unstructured log records. The CRM worker 202 in the illustrated compensating resource manager architecture 200 is not permitted to mix structured and unstructured log records, and must write log records of only one of these types.

When the log record is built, the CRM worker 202 at step 282 calls a "WriteLogRecord( )" method (or "WriteLogRecordVariants( )" method for structured log records) on the "ICrmLogControl interface 230 of the CRM clerk 222 to copy the log record into a queue. As indicated at step 283, the CRM worker may repeat the steps 281–282 multiple times to enqueue multiple log records.

After the CRM worker 202 has queued all the log records for the action that the CRM worker 202 is about to take on the resource, the CRM worker 202 calls the "ForceLog( )" method on the "ICrmLogControl interface 230 of the CRM clerk 222 in step 284 to cause the queued log records to be written out to the persistent log 226. The separate "WriteLogRecord( )" and "ForceLog( )" methods thus allow the CRM worker 202 to queue up multiple log records and have them written together to the persistent log 226, which enhances logging efficiency.

The implementation of the "WriteLogRecord( )," "WriteLogRecordVariants( )," and "ForceLog methods( )" in the CRM clerk 222 use the ILog interface 246 of the log object 240 to cache and then force written log records to the log file 244.

Checkpoints

With reference again to FIG. 3, the persistent log 226 uses checkpoints to reclaim space of log records from completed transactions in the log file 244.

The CRM recovery clerk 224 periodically issues initiate check point requests to the recovery engine 242, by calling the "TakeCheckpoint( )" method on the ILogRecover interface 248. The CRM recovery clerk 224 has a background thread which waits on events or a timeout. On timeout, the CRM recovery clerk 224 checks whether any log records have been written since the last checkpoint. If not, no checkpoint request is initiated. These periodic check point requests allow the recovery engine to automatically resize or grow the log file 244 if not sufficient for the transaction rate and volume of log records.

The CRM recovery clerk 224 also checks whether there currently are any CRM clerks before initiating a check point request. If there are none, no check point request is initiated. If there currently are CRM clerks, the CRM recovery clerk 224 logs the clerk instance identifiers of the CRM clerks so that the CRM clerks can be created correctly during recovery processing. The CRM recovery clerk 224 logs a single log record, the "clerk list record," containing the clerk instance identifiers of all current CRM clerks.

The CRM recovery clerk 224 further governs truncation of the log. During check point processing by the recovery engine 242, the recovery engine 242 (using the "ILogRecoverClerk::WriteCheckpoint( )" method) has the CRM recovery clerk 224 and each CRM clerk 222 write checkpoint log records and return the minimum LSN used for their log records. The CRM recovery clerk 224 writes the clerk list log record prior to issuing the initiate check point request to the recovery engine, then returns the LSN of the clerk list log record as its minimum LSN from the recovery engine's write check point request. This guarantees that the clerk list record occurs before any check point records of the CRM clerks 222 in the log file 244, and that the last two check points are maintained in the log file 244.

In response to the recovery engine's write check point requests to the CRM clerks, each CRM clerk 222 copies its log records forward on an every other check point basis. More specifically, the first time the CRM clerk 222 is called with a write check point request and has a transaction in progress, the CRM clerk 222 returns it minimum LSN in use. The next time, the CRM clerk 222 copies forward all its log records, and returns its new minimum LSN. In copying forward, the CRM clerk 222 reads all log records that it has written to the log file 244, and rewrites the log records to the log file 244. This approach means that only the last two check points are retained in the log file 244, while reducing the frequency at which the CRM clerk 222 must copy forward its log records. The persistent log 226 can then wrap to reuse space freed up from completed transactions. Preferably, the timeout interval of the CRM recovery clerk's initiate check point requests is tuned so that most of the transactions complete within two check points and copy forward normally is not required of the CRM clerk 222.

The CRM clerk 222 begins writing a check point with a begin check point record and ends with an end check point record. This allows the boundaries of the check point to be accurately identified during recovery, and to determine whether the check point was completed successfully or interrupted in a failure. The CRM clerk 222 further adds a sequence number to each log record that it writes, and adds a copy flag to log records that are copied forward in a check point. When copying forget records (that identify a previous log record that is to be forgotten) forward, the CRM clerk 222 updates the forget record to properly identify the forgotten log record by its new (copied forward) LSN.

During check point processing, the CRM clerk 222 blocks new log record writes from the CRM worker 202 or CRM compensator 206 so as to preserve the order of log records written via the CRM clerk. Also, two phase commit notifications are blocked while a check point is in progress. Check point requests likewise are blocked during normal writes to the persistent log 226 and during processing transaction completion notifications.

Compensating

In the illustrated CRM architecture 200 of FIG. 3, the transaction manager 148 (FIG. 2) provides the two phase commit notifications to the compensating resource manager through the ITransactionResourceAsync interface 238 of the recovery engine 242 (which enlisted on the transaction during registration of the CRM clerk 222 with the recovery engine). For each notification, the recovery engine 242 reads all log records that have been written to the log in association with the clerk instance identifier of the CRM clerk 222 (which includes the log records written by the CRM worker 202 for its normal action). The recovery engine 242 then passes the notification and log records to the CRM clerk 222 using the ILogRecoverClerkPhaseNotification interface (described below) of the CRM clerk.

The CRM clerk 222 responds to the recovery engine's calls by creating the CRM compensator 206 using the CLSID registered with the CRM resource dispenser 220. The CRM clerk 222 then calls a method of the ICrmCompensator (in the unstructured log records case) or ICrmCompensatorVariants (structured log records case) interface 212 on the CRM compensator 206 that is appropriate to the respective two phase commit notification (e.g., the BeginPrepare( ), PrepareRecord( ), and EndPrepare( ) for the prepare phase notification). The CRM clerk 222 additionally passes a pointer to its ICrmLogControl interface in a call to the "SetLogControl" method on the ICrmCompensator (or ICrmCompensatorVariants) interface 212 of the CRM compensator 206, which the CRM compensator uses for logging its compensating action.

The implementation of the two phase commit notification methods in the CRM; compensator 206 performs the appropriate actions specific to the resource for the action logged by the CRM worker. (As noted above, the implementation of the CRM compensator is provided by the developer, e.g., a systems integrator or other programmer, of the compensating resource manager. for a particular resource.) In the prepare notification methods (i.e., "BeginPrepare( )," "PrepareRecord( )" and "End Prepare( )"), the CRM compensator 206 determines whether the work done on the resource in the transaction is properly prepared to commit. In the case of most implementations of the CRM compensator, the work of the CRM worker 202 in the transaction has already been made persistent on the resource at the time it was performed by the CRM worker. The CRM compensator therefore can be implemented so as to simply set the "bOkToPrepare" parameter of the "EndPrepare( )" method to "VARIANT_TRUE" and return. In other implementations, the CRM compensator 206 may perform checks to determine whether the work should remain persisted or be compensated, and set the "bOkToPrepare" parameter accordingly. For example, the check may determine whether the work done by the CRM worker is correct or consistent.

For the commit notifications (e.g., the "BeginCommit( )," "CommitRecord( )" and "EndCommit( )" methods), the CRM compensator 206 can perform any clean-up actions to complete the work of the CRM worker on the resource. For example, where the resource is a file system and the compensating, resource manager is to provide the capability to delete files within a transaction, the CRM worker's normal action may be to rename or hide the file to be deleted, so that the file can be restored on an abort of the transaction. The CRM compensator in this example performs a clean-up action that actually deletes the renamed or hidden file upon a commit of the transaction. The CRM compensator receives the log records of the CRM worker's action (via the "CommitRecord( )" method), such as to read the name of the renamed or hidden file. The CRM compensator also uses the ICrmLogControl interface of the CRM clerk 222 to log the clean-up actions for recovery purposes. The CRM compensator writes the log information after performing the clean-up action to ensure the clean-up action is taken. In the above example of the delete file compensating resource manager for instance, the CRM compensator 206 logs that the renamed or hidden file has been deleted after deleting the file. If a failure then occurs during the commit phase of the transaction, the clean-up action can be omitted during subsequent recovery. The clean-up action implemented in the "EndCommit( )" method should be idempotent, so that it may be attempted multiple times with the same results as if it succeeds on the first attempt. Such as in a case where a failure occurs after the CRM compensator performs the clean-up action but before logging that the clean-up action was done, or when failures occur during recovery.

In the abort notification methods, the CRM compensator 206 performs an idempotent compensating action to reverse the work of the CRM worker 202 that typically is already persisted on the resource. The CRM compensator receives the information logged by the CRM worker with the "AbortRecord( )0" method. The CRM compensator also logs the compensating action with the CRM clerk 222 on a write-after basis. In the above example of the delete file compensating resource manager for instance, the CRM compensator can be implemented so as to restore the renamed or hidden file in the "EndAbort( )" method.

After the CRM compensator successfully completes processing its compensating actions for the commit or abort notification, the CRM clerk 222 writes a clerk end log record to the persistent log 226 to indicate it processing its done and the CRM clerk 222 can be released. The CRM clerk 222 also notifies the CRM recovery clerk 224 so that it can be removed from the list of currently registered CRM clerks.

Recovery

In the illustrated CRM architecture 200 shown in FIG. 3, the system-provided infrastructure (e.g., the CRM recovery clerk 224 and the recovery engine 242) also perform recovery after a failure occurs that interrupts normal processing. Recovery is initiated on startup of the ASP 90 (FIG. 2). During startup processing of the ASP 90, the CRM architecture 200 is loaded into the ASP, and the CRM recovery clerk 224 is created. At startup, the CRM recovery clerk 224 looks for the log file 244 associated with the ASP. As described above, the log file 244 has a file name based on an identifier (the AppId) of the ASP, and resides on a same file system path as a log file of the transaction manager 148 (FIG. 2). If the log file 244 exists for the ASP, the CRM recovery clerk initiates recovery on the log file 244 (e.g., by creating the recovery engine 242 and calling the "ILogRecover::Recover( )" method of the recovery engine).

The recovery engine 242 implements recovery processing according to the ARIES recovery protocol, and drives each clerk that was registered with the recovery engine (e.g., the CRM recovery clerk 224 and each CRM clerk 222) through analysis, redo and undo phases of recovery processing (using the ILogRecoverClerk interface implemented on the CRM recovery clerk 224 and each CRM clerk 222). During normal processing, the CRM recovery clerk 224 logs clerk list log records (prior to check points) and new clerk log records (when a new CRM clerk is created between check points). Due to the way the CRM recovery clerk logs these records, the clerk list and new clerk records identifying the CRM clerk 222 precede (i.e., have lower LSNs) any records logged by such CRM clerk in the log file 244. During recovery, the recovery engine therefore causes the CRM recovery clerk 224 to perform recovery processing of the records identifying the CRM clerk 222 prior to causing the CRM clerk 222 to perform recovery processing of the log records that the CRM clerk wrote. When processing the clerk list and new clerk log records in the analysis phase of recovery, the CRM recovery clerk 224 creates a new CRM clerk for each clerk instance identifier identified in the records, and assigns it the respective clerk instance identifier. The created CRM clerk identifies itself to the recovery engine 242 with the assigned clerk instance identifier and. is then available to receive the log records logged with that clerk instance identifier from the recovery engine. The CRM clerk 222 is responsible for properly interpreting the log records, creating the registered CRM compensator 206 and calling the appropriate methods on the CRM compensator according to the transaction outcome.

In the analysis phase, the recovery engine 242 passes all log records associated with the clerk instance identifier of the CRM clerk 222 to the CRM clerk (via the "ILogRecoverClerk::AnalyzeRecord( )" method). The CRM clerk analyzes the log records to perform the appropriate recovery processing. First, the CRM clerk looks for a clerk end record. The CRM clerk logs a clerk end record during normal processing only after the compensating action of the CRM compensator on a commit or abort notification. If a clerk end record is detected, the CRM clerk 222 concludes that the transaction completed successfully (including the compensating actions of the CRM compensator 206) and no recovery is necessary for this instance of the CRM clerk.

If no clerk end record is detected, the CRM clerk 222 proceeds to identify a correct sequence of the log records originally written by the CRM clerk. The CRM clerk 222 may have survived through multiple check points before the failure, resulting in duplicate copies of some log records with old LSNs. The CRM clerk 222 orders the log records it receives from the recovery engine 242 by their LSN. The CRM clerk 222 processes the log records to ensure that only one record with a given sequence number exists. Any duplicates are discarded. Additionally, the CRM clerk 222 processes the list for forget log records, and marks the log records that are to be forgotten. The resulting list is the correct log record sequence for the CRM clerk 222.

During its analysis phase, the CRM clerk 222 also looks for a clerk begin record in which the CRM clerk logged the class identifier of the CRM compensator which was registered by the CRM worker 202. At the end of its analysis phase, the CRM clerk 222 returns the least LSN in the identified log record sequence to the recovery engine 242.

After the analysis phase, the recovery engine 242 further drives the CRM recovery clerk 224 and each CRM clerk 222 through redo and undo phases (via "BeginRedoPass( )," "RedoRecord( )," "BeginUndoPass( )" and "UndoRecord( )" methods of the ILogRecoverClerk interface), and also delivers notifications to the CRM clerk as to the status of the CRM clerk's transaction (via the IRecoverClerkPhaseNotification interface). The CRM recovery clerk 224 and the CRM clerk 222 ignore the redo and undo phases of recovery. The recovery engine 242 determines the transaction status from log records that it logged during normal processing, or by again enlisting on the transaction with the transaction manager 148 (FIG. 2).

If the recovery engine 242 finds a prepare record logged for the transaction, the recovery engine delivers a prepare notification to the CRM clerk 222 having the transaction during recovery (via the "OnPrepare( )" method of the IRecoverClerkPhaseNotification interface). However, since prepare is not meaningful to the CRM compensator during recovery, the CRM clerk 222 does not pass the prepare notification to the CRM compensator.

Upon determining that the transaction was committed or aborted, the recovery engine 242 delivers the appropriate notification to the CRM clerk 222 having the transaction during recovery (via the "OnCommit( )" or "OnAbort( )" methods of the IRecoverClerkPhaseNotification interface). As during normal processing, the CRM clerk 222 responds to these notifications by creating the CRM compensator, and delivering the commit or abort notification to the CRM compensator along with the log records that were written by the CRM worker (via the "BeginCommit( )," "CommitRecord( )," "EndCommit( )," "BeginAbort( )," "AbortRecord( )" and "EndAbort( )" methods of the ICrm-Compensator interface 212). This causes the CRM compensator to. perform the appropriate clean-up action (for commit) or compensating action (for abort) based on the log records. After the CRM compensator successfully completes this processing, the CRM clerk 222 writes a clerk end record to indicate its processing is done, and the CRM clerk can be released. The CRM clerk 222 also notifies the CRM recovery clerk 224 so that is can be removed from the list of registered CRM clerks.

If the recovery engine 242 determines that the transaction is in doubt upon re-enlisting on the transaction with the transaction manager 148 (FIG. 2), the recovery engine so notifies the CRM clerk 222 having the transaction (via the "OnInDoubt( )" method of the ILogRecoverClerk interface). In this case, the CRM clerk is responsible for maintaining its log records in the log file 244 through all subsequent check points.

At the end of recovery, the recovery engine 242 notifies the CRM recovery clerk 222 and the CRM clerk 224 that recovery is completed (via the "EndRecovery( )" method of the ILogRecoverClerk interface). If its transaction was completed during recovery, the CRM clerk 222 is released. The CRM recovery clerk 224 remains after recovery to maintain the list of registered CRM clerks and to initiate check point requests.

Human Compensation

In some compensating resource managers implemented with the CRM architecture 200 (FIG. 3), the CRM compensator 206 can use human compensation as part of its clean-up and/or compensating actions. As part of the two phase commit protocol, it is essential that the compensating resource manager be able to perform the appropriate actions to commit or abort the transaction after voting affirmatively in the prepare phase. In compensating resource managers using human compensation, the CRM compensator relies on human action in cases where the clean-up or compensating action fails. On such failure, the CRM compensator provides output to inform a human operator to take appropriate manual action to correct the situation. The CRM compensator then continues as if the clean-up or compensating action had succeeded, such as logging appropriate information and indicating "success." (i.e., as the HRESULT return value of the method) on return from the "EndCommit( )" or "EndAbort( )" call. If necessary, the CRM compensator can request that the CRM clerk 222 replay the log records from the start by returning an error code to the CommitRecord( )" or "AbortRecord" calls by which the log records are delivered from the CRM clerk. This allows the full sequence of log records to be saved to a separate file for use in later human compensation when the failure that requires human compensation occurs part way through the CRM compensator's processing of the log records.

The notice to the human operator can be in the form of an on screen visual notice, audio notice, print-out report, or other notice. Usually, so as to provide sufficient information for the human operator to perform the required manual corrective action, the notice will include the log records relevant to the transaction in human readable format, or otherwise provide a way for the human operator to inspect such records (e.g., writing the log records to a separate file viewable by the human operator using a log viewing. utility).

For example, a compensating resource manager that effects credit card billing may use human compensation as part of the compensating action for a credit card charge. The compensating action where the transaction aborted is to perform a credit to the account. If the CRM compensator is unable to credit the account, such as due to unavailability of another computer or communications link needed to access the account information, the CRM compensator can instead perform the compensating action through human intervention. The CRM compensator notifies the human operator that manual action is needed, and may provide access to the log records for the operator to determine which account to credit and the amount.

Deferred Recovery

In some compensating resource managers implemented with the CRM architecture 200 (FIG. 3), the CRM compensator 206 alternatively can use deferred recovery as part of its clean-up and/or compensating actions. With deferred recovery, the log records of the CRM worker's normal actions remain in the persistent log 226 when the clean-up or compensating action of the CRM compensator 206. fails during normal processing or during recovery processing. The CRM compensator 206 returns a failure result from the "EndCommit( )" or "EndAbort( )" methods. Since the commit or abort phase of the transaction does not complete, the transaction continues to exist and the transaction manager 148 (FIG. 2) retains information on the transaction. The CRM architecture 200 and MTS execution environment 82, however, continue with recovery processing (if during recovery) and also normal processing of other transactions. In a later recovery, the CRM clerk 222 causes the CRM compensator 206 to re-attempt the deferred clean-up or compensating action.

Interface Definitions

The ICrmLogControl Interface. With reference again to FIG. 3, the CRM clerk 222 supports the ICrmLogControl interface 230. The ICrmLogControl interface 230 is used by the CRM worker 202 and possibly also the CRM compensator 212 to write records to the persistent log 226. The CRM worker 202 also registers its counterpart CRM compensator 212 with the CRM clerk 222 using the ICrmLogControl interface 230.

The ICrmLogControl interface provides a set of methods as shown in the program listing of FIG. 6. The "TransactionUOW( )" method is used by the CRM to obtain a Transaction Unit Of Work identifier of the transaction in which the CRM worker performs its normal action.

As discussed above, the CRM worker 202 calls the "RegisterCompensator( )" method to register its counterpart CRM compensator 206 with the CRM clerk 222. The CRM worker 202 calls the method first after obtaining a pointer to the ICrmLogControl interface (i.e., before using the interface to write any log records to the persistent log), and can only call the method successfully once (subsequent attempts or an attempt by the CRM compensator to call the method result in an E_FAIL return value). The CRM worker 202 specifies a class identifier (CLSID) or program identifier (PROGID) in string format of the CRM compensator 206 as the "IpcwstrProgIdCompensator" parameter in the call. The CRM worker 202 also passes a text description in the "IpcwstrDescription" parameter to be used for monitoring or administration. In addition to CRM compensator registration, the method also performs a number of validation checks to ensure that the CRM can proceed. These checks include verifying that the CRM compensator can be created, and supports at least one of the ICrmCompensator or ICrmCompensatorVariants interfaces (described below). If not, the method returns "E_FAIL" or "E_NOINTERFACE" values, respectively. The method further checks that the current context has valid transaction and activity identifiers. Finally, if the CRM recovery clerk has not completed recovery processing, or if it has detected fatal errors for the CRM, then the method returns values, "XACT_E_RECOVERYINPROGRESS" or "E_FAIL," respectively.

The "WriteLogRecordVariants( )" method is called by the CRM worker 202 and CRM compensator 206 to write structured log records to the log. Structured records are records made up as a collection of Variant-type values. Typically, this method is used where the CRM worker and CRM compensator are written in Microsoft Visual Basic, and the structured record is a Visual Basic Collection object. The method returns a failure code, "E_FAIL," if the CRM compensator 206 that was registered by the CRM worker 202 does not support the ICrmCompensatorVariants interface. The CRM worker and CRM compensator are not permitted to use both structured and unstructured log records. Accordingly, a call to this method after a previous successful call to the "WriteLogRecord( )" method will return an "E_FAIL" value. The method also will return the "E_FAIL" value if called by the CRM worker 202 after the transaction has completed or is in the process of completing. However, the CRM compensator can continue to use the method to write further log records during transaction outcome notifications.

The "ForceLog( )" method is called by the CRM worker 202 and CRM compensator 206 to cause log records that were previously written using the "WriteLogRecord( )" or "WriteLogRecordVariants( )" methods to be written out to the persistent log 226, which is in persistent memory of the computer (e.g., the hard drive 27 in FIG. 1) where it survives failure. With the log information persisted, the CRM worker 202 can proceed with its normal action on the resource.

The "ForgetLogRecord( )" method is called by the CRM worker 202 or CRM compensator 206 to cause the CRM clerk to forget the last log record that was written (e.g., using the "WriteLogRecord( )" or "WriteLogRecordVariants( )" methods). In the illustrated CRM architecture 200, the method can only be used to forget the last log record written, and does not allow nesting. The forgotten log record is not delivered to the CRM compensator during two phase commit notifications.

The CRM worker 202 calls the "ForceTransactionToAbort( )" method to unilaterally cause the transaction to immediately abort (e.g., via a call to the MTS ITransaction::Abort method, as described in more detail in the above incorporated MTS Patent Applications). A call to the method from the registered CRM compensator 202 returns a failure code "E_FAIL," because the CRM compensator is not active unless the transaction is in the process of completion. The "WriteLogRecord( )" method is called by the CRM worker 202 or CRM compensator 206 to write unstructured log records (which typically are used where the CRM worker and CRM compensator are written in Microsoft Visual C++ or Visual J++). The unstructured records are simply a buffer of bytes. The method provides a gathering capability by allowing sections of the log record to built up by the CRM worker (or compensator) as an array of such buffers (the "rgBlob" parameter), which are then copied to a buffer maintained by the CRM clerk in a single operation by this method. The method will return a failure code ("E_FAIL") in the following cases: (1) the registered CRM compensator does not support the ICrmCompensator interface, (2) the method was called after a previous successful call to the "WriteLogRecordVariants( )" method (since the CRM clerk does not allow structured and unstructured records to be mixed), and (3) the CRM worker calls the method after the transaction has completed or is in the process of completing.

The ICrmCompensator and ICrmCompensatorVariants interfaces. With reference still to FIG. 3, the CRM compensator 206 supports one or both of the ICrmCompensator or ICrmCompensatorVariants interfaces 212. The interfaces are used by the CRM clerk 222 to deliver two phase commit notifications, and the records logged by the CRM worker 202 during its normal action to the CRM compensator. As discussed above for the ICrmLogControl interface, the records for a particular CRM are required to be all either structured or unstructured depending on whether the "WriteLogRecordVariants( )" or "WriteLogRecord( )0" method was used, respectively. The ICrmCompensator interface is used to deliver unstructured log records, while the ICrmCompensatorVariants interface delivers structured log records to the CRM compensator.

The ICrmCompensator and "ICrmCompensatorVariants interfaces are defined in the program listings 302–303 shown in FIGS. 7 and 8. The "SetLogControl( )" method is called by the CRM clerk 222 first after creating the CRM compensator 212 to pass a pointer to the CRM clerk's ICrmLogControl interface 230 (as the "pLogControl" parameter) to the CRM compensator 212. This allows the CRM° Compensator to write further log records during transaction completion. A return value other than "S_OK" from this method is considered an error of the CRM compensator that will cause a "failfast" of the ASP 90, unless specifically overridden via a registry flag for the CRM compensator CLSID.

The "BeginPrepare( )" method is called by the CRM clerk 222 as the prepare notification (phase 1 of the two phase commit protocol) to the CRM compensator, and indicates that log records are about to be delivered. The prepare notification is sent only during normal processing, and not during recovery. Again, a return value other than "S_OK" is considered a CRM compensator error.

The "PrepareRecord( )" method is called by the CRM clerk 222 to deliver a log record to the CRM compensator 206 during the prepare phase. The log records are delivered in forward order. Unstructured log records are delivered as a "CrmLogRecordRead" data structure, which contains a flags field ("dwCrmFlags"), a sequence number ("dwSequenceNumber"), and the log record data ("blobUserData"). The flags field and sequence number provide information that may be useful for debugging or fault identification in circumstances where human compensation is necessary. The flags field includes flags that indicate whether the record was forgotten, and when the record was written. The sequence number of the log record indicates its sequence in the persistent log 226. The CRM compensator 206 can set the forget flag (the "pfForget" parameter) on return from the method to cause the CRM clerk to forget the log record delivered by the method call. The CRM compensator can return the value ERROR_REPLAY_RECORDS" to cause the CRM clerk 222 to repeat delivery of all the log records written by the CRM worker, including also those that were forgotten and those written by the CRM compensator during the prepare phase. A return value other than "S_OK" or "ERROR_REPLAY_RECORDS" is considered a CRM compensator error that causes a failfast of the ASP 90. The "PrepareRecordVariants( )" method is similar to the "PrepareRecord( )" method, but delivers structured log records.

The "EndPrepare( )" method is called by the CRM clerk 222 to indicate that all log records available during the prepare phase have been delivered. If no log records were written by the CRM worker 202, the CRM clerk omits calling the PrepareRecord or "PrepareRecordVariants( )" methods between its calls to the "BeginPrepare( )" and "EndPrepare( )" methods. The CRM compensator votes on the transaction outcome using the "fOkToPrepare" parameter. A return value other than "S_OK" is considered a CRM compensator error that causes a failfast of the ASP 90.

The CRM clerk 222 calls the "BeginCommit( )" or "BeginAbort( )" methods to deliver a commit or abort notification, respectively, to the CRM compensator. The call also indicates to the CRM compensator that log records are about to be delivered for processing the commit or abort actions by the CRM compensator 206. The "fRecovery" parameter is a flag indicating whether the method is being called during recovery or normal processing. A return value other than "S_OK" is considered a CRM compensator error that causes a failfast of the ASP 90.

The "CommitRecord( )" and "AbortRecord( )" methods are called by the CRM clerk 222 to deliver an unstructured log record during the commit or abort phase processing. For structured log records, the CRM clerk calls the similar "CommitRecordVariants( )" or "AbortRecordVariants( )" methods. For the "CommitRecord( )" method, the CRM clerk 222 delivers log records in the forward order. For the "AbortRecord( )" method, the CRM clerk 222 delivers log records in reverse order. If no log records were written, the CRM clerk 222 omits calling the "CommitRecord( )" (or "AbortRecord( )") between "BeginCommit( )" (or "BeginAbort( )") and "EndCommit( )" (or "EndAbort( )") calls. The CRM compensator can set the forget flag parameter ("fForget") on return to cause the CRM clerk 222 to forget the delivered log record. A return value other than "S_OK" or "ERROR_REPLAY_RECORDS" is considered a CRM compensator error that causes a failfast of the ASP 90.

The "EndCommit( )" and "EndAbort( )" methods are called by the CRM clerk 222 to notify the CRM compensator that all log records have been delivered during the commit or abort phase. The CRM clerk 222 is free to discard all log records for the transaction upon successful completion of this method. A return value other than "S_OK" is considered a CRM compensator error that causes a failfast of the ASP 90.

The ILogRecover Interface. The recovery engine 242 supports the ILogRecover interface 248. The interface is used by the CRM recovery clerk 224 to initiate check points during normal processing (via a call to the "TakeCheckpoint( )" method), and to initiate recovery on the log file 244 during recovery processing (via the "Recover( )" method). The ILogRecover interface is defined in the program listing 306 shown in FIG. 10.

The ILogRecoverClerk interface. The CRM recovery clerk 224 and each CRM clerk 222 implement the ILogRecoverClerk interface. The recovery engine 242 uses the ILogRecoverClerk interface to drive the CRM recovery clerk 224 and the CRM clerk 222 through phases of recovery, and deliver the log records related to such clerk during the recovery phases. The recovery engine 242 also uses the ILogRecoverClerk interface to cause the CRM recovery clerk 224 and the CRM clerk 222 to perform their check point processing (via the "WriteCheckpoint( )" method). The ILogRecoverClerk interface is defined by the program listing 308 shown in FIG. 11.

Figure 12:
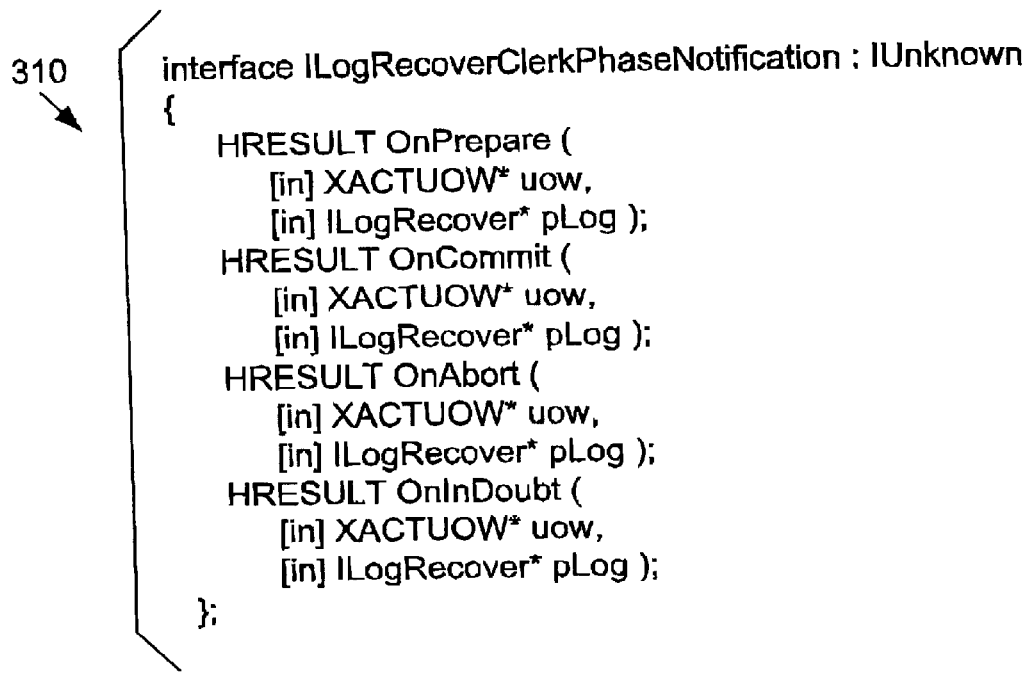
FIG. 12 is a program listing of an "ILogRecoverClerkPhaseNotification" interface of the CRM recovery clerk and the CRM clerk in the compensating resource manager architecture of FIG. 3.

The ILogRecoverClerkPhaseNotification Interface. The CRM clerk 222 implements the ILogRecoverClerkPhaseNotification interface. As the recovery engine 242 receives two phase commit notifications from the transactions in which it has enlisted, the recovery engine uses the ILogRecoverClerkPhaseNotification interface to pass the notification to the CRM clerk 222 that has the transaction. The ILogRecoverClerkPhaseNotification interface is defined in the programming listing 310 shown in FIG. 12.

The ILogRecoverClerkRegistration Interface. The recovery engine 242 supports the ILogRecoverClerkRegistration, which is called by the CRM recovery clerk 224 and the CRM clerk 222 to register with the persistent log 226. As described above, the CRM recovery clerk 224 registers its class identifier (CLSID) with the recovery clerk, while the CRM clerk registers a clerk instance identifier that uniquely identifies the CRM clerk 222 among other CRM clerks of the same class. The ILogRecoverClerkRegistration interface is defined in the program listing 312 shown in FIG. 13.

The ILog Interface. The log object 240 implements the ILog interface, which provides services to the CRM clerk 222, the CRM recovery clerk 224 and the recovery engine 242 for stably writing log records to the log file 244. The ILog interface is defined in the program listing 314 shown in FIG. 14.

Having described and illustrated the principles of my invention with reference to an illustrated embodiment, it will be recognized that the illustrated embodiment can be modified in arrangement and detail without departing from such principles. It should be understood that the programs, processes, or methods described herein are not related or limited to any particular type of computer apparatus, unless indicated otherwise. Various types of general purpose or specialized computer apparatus may be used with or perform operations in accordance with the teachings described herein. Elements of the illustrated embodiment shown in software may be implemented in hardware and vice versa.

For example, while the illustrated CRM architecture 200 provides an interface (the u"ICrmLogControl::RegisterCompensator( )" method) to register the CRM compensator 206, compensating resource managers according to the invention can alternatively log an identification (e.g., CLSID or PROGID) of the compensator object in the log information written to the persistent log 226 to be used by the system-provided infrastructure (e.g., the CRM clerk 222 and the CRM recovery clerk 224) to create the compensator component to process two phase commit notifications of the transaction manager 148 (FIG. 2).

In view of the many possible embodiments to which the principles of my invention may be applied, it should be

27 recognized that the detailed embodiments are illustrative only and should not be taken as limiting the scope of my invention. Rather; I claim as my invention all such embodiments as may come within the scope and spirit of the following claims and equivalents thereto.

I claim:

1. In a computer, a component-based-resource management framework for managing a managed resource to participate within a transaction under control of a transaction manager, the transaction manager transmitting notifications to participating components according to a two-phase commit protocol, the framework comprising:
   a log storage for durably recording log entries;
   a generalized interface for integrating resource specific management code into the framework;
   a compensating resource manager containing component-based code specific to the managed resource and integrated into the framework via the generalized interface and operating in response to a client application request to perform work persistently altering data held in the managed resource within the scope of a transaction, the compensating resource manager logging information in the log storage sufficient to fully reverse the work; and
   the compensating resource manager operating in response to a notification from the transaction manager indicating the transaction aborted to perform a compensating action according to the logged information to fully reverse the work.

2. The component-based framework of claim 1 wherein the compensating resource manager comprises a worker component and a compensator component, the worker component operating to perform the work and log the information in the log storage, the compensator component operating to perform the compensating action according to the logged information, the worker component passing information to the compensator component solely by way of the log storage.

3. computer-readable storage medium having stored thereon computer executable program code of a component-based resource management framework for integrating a durable resource into a transaction processing system so as to participate within a transaction under control of a transaction manager, said integrating being through use of a worker component operative to perform a work operation on the durable resource at request of an application and a compensator component operative to perform a compensating operation that reverses the work operation, the component-based framework comprising:
   a compensator registering component having a compensator registration interface for calling by the worker component to register the compensator component;
   a logging component having a logging interface for calling by the worker component to persistently log information of the work operation;
   a compensation initiating component having a notification interface for receiving notification from the transaction manager that the transaction is to abort, and operative to create the compensator component and further operative in response to the notification to cause the compensator component to perform the compensating operation based on the information logged by the work component to thereby reverse the work operation.

4. The computer-readable storage medium of claim 3 wherein the compensator registering component passes a pointer to the logging interface to the worker component on return from the worker component's call to the compensator registration interface.

28

5. The computer-readable storage medium of claim 3 wherein the compensator registering component is further operative in response to the worker component's call to the compensator registration interface to enlist the compensation initiating component in a transaction in which the worker component participates, such that the compensation initiating component receives the notification from the transaction manager.

6. The computer-readable storage medium of claim 3 wherein the compensation initiating component is further operative to receive a prepare notification from the transaction manager on the notification interface, and operative in response to the prepare notification to cause the compensator component to perform a vote operation as to whether to abort the transaction in a prepare phase of the transaction.

7. The computer-readable storage medium of claim 3 wherein the compensation initiating component is further operative to receive a commit notification from the transaction manager on the notification interface, and operative in response to the commit notification to cause the compensator component to perform a clean-up operation and any real operation according to the logged information to complete work partly accomplished by the work operation.

8. In an on-line transaction processing system having a transaction manager, a compensating resource manager for managing a durable resource to participate within a transaction under control of the transaction manager, the compensating resource manager comprising:
   a worker component having a work request interface for calling by an application to request a work operation on the durable resource as part of the transaction, the worker component operating in response to the application call to persistently write information pertaining to the requested work operation into a log and to perform a work action to effect the work operation on the durable resource; and
   a compensator component having a notification interface for receiving a notification issued by the transaction manager to abort the transaction, the compensator component operating in response to the notification to read the information from the log and to perform a compensating action to reverse the effect of the work action on the durable resource;
   wherein the worker component and the compensator component share state solely through the information logged by the worker component.

9. The compensating resource manager of claim 8 further comprising:
   a compensation manager having a compensator registration interface for calling by the worker component to register the compensator component, the compensation manager operating in response to the worker component call to create the compensator component and enlist in the transaction to receive the notification issued by the transaction manager.

10. The compensating resource manager of claim 9 wherein the compensation manager is further operative in response to the worker component call to provide access for the worker component to write the information to the log.

11. The compensating resource manager of claim 8 for further recovering after failure during the transaction, the compensating resource manager comprising:
   a recovery manager operative when recovery is initiated after the failure to determine an outcome of the transaction from the transaction manager, to create the compensating component, and to cause the compensating component to perform the compensating action based on the information from the log if the outcome was to abort the transaction.

12. The compensating resource manager of claim 11 wherein the recovery manager is further operative on failure of the compensating component to perform the compensating action during recovery, to preserver the information in the log so as to defer the compensating action to a subsequent recovery.

13. The compensating resource manager of claim 8 wherein the compensating component is operative on failure to perform the compensating action during recovery, to cause notice and information to be provided to a human operator for the human operator to take manual action that reverses an action on the resource.

14. The compensating resource manager of claim 8 wherein the compensating action of the compensating component is idempotent.

15. The compensating resource manager of claim 8 wherein the compensating action of the compensating component is not reversible.

16. In a framework-developer implemented component based transaction processing framework, when a selected resource does not support the transaction processing protocol of the framework, a method of integrating the resource with the framework, the method comprising:
    altering the resource by a worker component containing code implemented by a second party developer;
    reinstating the resource by a compensator component containing code implemented by the second party developer;
    wherein logging and recovery of the resource is supported by the framework such that resource alterations remain durable on the resource upon transaction committal, and the resource is reinstated to a pre-transaction condition upon transaction abort.

17. In a framework-developer implemented component based transaction processing framework, when a selected resource does not support the transaction processing protocol of the framework, a method of integrating the resource with the framework, the method comprising:
    accepting resource update requests from a worker component containing executable instructions implemented by a second party developer;
    logging the resource update requests;
    updating the resource according to the update resource requests;
    associating the worker component with a compensator component; and
    upon a transaction abort, accepting resource reinstatement requests from the compensator component, said compensator component containing executable instructions implemented by the second party developer.

18. In a component based transaction processing framework, when a selected resource does not support the transaction processing protocol of the framework, a method of providing transaction processing support for the resource, the method comprising:
    accepting at an exposed interface, requests made by code implemented by a second party developer, said code requesting the creation of a clerk component, the registration of a compensator component, and resource changes;
    creating the clerk, registering the compensator component, and logging changes made to the resource in response to requests made at the exposed interface; and
    creating the compensator component and passing the compensator component the changes made to the resource during the transaction, in response to a transactaction commit or abort indication.

19. The method of claim 18, further comprising;
    logging changes made to the resource in response to requests made by the compensator component.

20. In a component based transaction processing framework with an exposed interface, when a selected resource does not support the transaction processing protocol of the framework, and a second party developer is developing a server application program that will be making changes to the resource, a method used by the second party developer to integrate the resource with the transaction processing protocol of the framework, the method comprising:
    creating a component comprising the interface and instructions for requesting the creation of a clerk component, requesting the registration of a compensator component, and logging changes to the resource; and
    creating the compensator component comprising instructions for instantiating the compensator component, receiving an indication that a transaction is aborted, and receiving an identification of logged changes to the resource.

21. In a component-based resource management system for integrating component code for managing a resource with a transaction framework, a developer in a first role developing a transaction manager, and a developer in a second role developing a compensating resource manager for managing a resource to participate within a transaction under control of the transaction manager, the compensating resource manager comprising:
    a worker component having a work request interface for calling by an application to request a work operation on the resource as part of the transaction, the worker component operating in response to the application call to persistently write information pertaining to the requested work operation into a log and to perform a work action to effect the work operation on the resource; and
    a compensator component having a notification interface for receiving a notification issued by the transaction manager to abort the transaction, the compensator component operating in response to the notification to read the information from the log and to perform a compensating action to reverse the effect of the work action on the resource;
    wherein the worker component and the compensator component share state solely through the information logged by the worker component.

22. In a computer, a component-based framework for managing a resource to participate within a transaction under control of a transaction manager, the transaction manager developed by a party in a first role and transmitting notifications to participating components according to a two-phase commit protocol, the framework comprising:
    a log storage component developed by the party in the first role for recording log entries;
    a compensating resource manager developed by a party in a second role and operating in response to a client application request to perform work persistently altering data held in the resource within the scope of a transaction, the compensating resource manager logging information in the log storage sufficient to fully reverse the work; and the compensating resource manager operating in response to a notification from the transaction manager indicating the transaction aborted to perform a compensating action according to the logged information to fully reverse the work.

23. In a computer, a framework-developer implemented component-based framework for managing a resource, to participate within a transaction under control of a transaction manager, the transaction manager transmitting notifications to participating components according to a two-phase commit protocol, the framework comprising:

a log storage for durably recording log entries;

a compensating resource manager operating in response to a client application request to perform work persistently altering data held in the resource within the scope of a transaction, the compensating resource manager logging information in the log storage sufficient to fully reverse the work; and the compensating resource manager operating in response to a notification from the transaction manager indicating the transaction aborted to perform a compensating action according to the logged information to fully reverse the work;

wherein plural executable instructions that persistently alter the data and fully reverse the work, are implemented by a second party developer.

24. A computer-readable storage medium having stored thereon computer executable program code of a component-based resource management framework developed by a first party framework developer for integrating a resource into a transaction processing system so as to participate within a transaction under control of a transaction manager, said integrating being through use of a worker component containing plural executable instructions implemented by a second party developer and operative to perform a work operation on the resource at request of an application and a compensator component containing plural executable instructions implemented by the second party developer and operative to perform a compensating operation that reverses the work operation, the component-based framework comprising:

a compensator registering component having a compensator registration interface for calling by the worker component to register the compensator component;

a logging component having a logging interface for calling by the worker component to persistently log information of the work operation;

a compensation initiating component having a notification interface for receiving notification from the transaction manager that the transaction is to abort, and operative to create the compensator component and further operative in response to the notification to cause the compensator component to perform the compensating operation based on the information logged by the work component to thereby reverse the work operation.

25. In an on-line transaction processing system developed by a first party and having a transaction manager, a compensating resource manager containing instructions implemented by a second party for managing a resource to participate within a transaction under control of the transaction manager, the compensating resource manager comprising:

a worker component having a work request interface for calling by an application to request a work operation on the resource as part of the transaction, the worker component operating in response to the application call to persistently write information pertaining to the requested work operation into a log and to perform a work action to effect the work operation on the resource; and a compensator component having a notification interface for receiving a notification issued by the transaction manager to abort the transaction, the compensator component operating in response to the notification to read the information from the log and to perform a compensating action to reverse the effect of the work action on the resource;

wherein the worker component and the compensator component share state solely through the information logged by the worker component.

* * * * *

UNITED STATES PATENT AND TRADEMARK OFFICE
CERTIFICATE OF CORRECTION

PATENT NO.    : 6,526,416 B1
DATED         : February 25, 2003
INVENTOR(S)   : Joe Dennis Long It is certified that error appears in the above-identified patent and that said Letters Patent is hereby corrected as shown below:

Title page,
Item [56], References Cited, OTHER PUBLICATIONS, the following citation is listed twice "D. Bruce, `The Treatment of State in Optimistic Systems,' IEEE, pp. 40-49 (June. 1995)."
Item 57, ABSTRACT,
Line 4, "a" should be changed to -- as --.

Column 1,
Line 31, "sin" should be changed to -- single --.
Line 40, ";" should be deleted.

Column 2,
Line 5, "e," should be deleted.

Column 3,
Line 16, "gas" should be changed to -- as --.
Line 24, "in" should be changed to -- In --.
Line 28, "for," should be changed to -- for --.
Line 43, "the," should be changed -- the --.

Column 4,
Line 26, "net" should be changed to -- not --.
Line 54, "manager." should be changed to -- manager --.

Column 5,
Line 35, delete the quotation mark after the word -- interface --.

Column 6,
Line 53, "disks," should be changed to -- disks --.
Line 64, "in, put" should be changed to -- input --.

Column 7,
Line 33, "stored." should be changed to -- store --.
Line 39, "to," should be changed to -- to --.

Column 8,
Line 12, "process)" should be changed to -- process.) --.

UNITED STATES PATENT AND TRADEMARK OFFICE
CERTIFICATE OF CORRECTION

PATENT NO.    : 6,526,416 B1
DATED         : February 25, 2003
INVENTOR(S)   : Joe Dennis Long It is certified that error appears in the above-identified patent and that said Letters Patent is hereby corrected as shown below:

<u>Column 12,</u>
Line 4, "all." should be changed to -- all --.

<u>Column 16,</u>
Lines 35 and 42, delete the quotation mark before the word "ICrmLogControl".

<u>Column 18,</u>
Line 34, "manager." should be changed to -- manager --.
Line 48, "persisted" should be changed to -- persistent --.
Line 57, "compensating," should be changed to -- compensating --.

<u>Column 19,</u>
Line 21, "AbortRecord( )0" should be changed to -- AbortRecord() --.
Line 30, "to indicate it processing its done and" should be changed to -- to indicate its processing is done and --.

<u>Column 21,</u>
Line 17, "to." should be changed to -- to --.
Line 23, "is" should be changed to -- it --.
Line 59, "success." should be changed to -- success --.
Line 63, insert a quotation mark before the word "CommitRecord()".

<u>Column 22,</u>
Line 11, "viewing," should be changed to -- viewing --.
Line 34, "206." should be changed to -- 206 --.

<u>Column 24,</u>
Lines 8-9, "to built" should be changed to -- to be built --.
Line 31, "WriteLogRecord( )0" should be changed to -- WriteLogRecord() --.
Line 36, delete the quotation mark before "ICRMCompensatorVariants".
Line 43, "CRM°" should be changed to -- CRM --.

<u>Column 25,</u>
Line 6, insert a quotation mark before the word "ERROR".

UNITED STATES PATENT AND TRADEMARK OFFICE
CERTIFICATE OF CORRECTION

PATENT NO.     : 6,526,416 B1
DATED          : February 25, 2003
INVENTOR(S)    : Joe Dennis Long It is certified that error appears in the above-identified patent and that said Letters Patent is hereby corrected as shown below:

<u>Column 29,</u>
Line 6, "preserver" should be changed to -- preserve --.

<u>Column 30,</u>
Line 34, "transactaction" should be changed to -- transaction --.

Signed and Sealed this

Third Day of February, 2004

JON W. DUDAS
*Acting Director of the United States Patent and Trademark Office*